(12) United States Patent
Saban et al.

(10) Patent No.: US 7,710,081 B2
(45) Date of Patent: May 4, 2010

(54) ELECTROMECHANICAL ENERGY CONVERSION SYSTEMS

(75) Inventors: Daniel M. Saban, Corona, CA (US); Raed H. Ahmad, Santa Ana, CA (US); Zhiguo Pan, Rowland Heights, CA (US)

(73) Assignee: Direct Drive Systems, Inc., Fullerton, CA (US)

( * ) Notice: Subject to any disclaimer, the term of this patent is extended or adjusted under 35 U.S.C. 154(b) by 428 days.

(21) Appl. No.: 11/751,450

(22) Filed: May 21, 2007

(65) Prior Publication Data

US 2008/0103632 A1    May 1, 2008

Related U.S. Application Data

(60) Provisional application No. 60/863,233, filed on Oct. 27, 2006, provisional application No. 60/864,882, filed on Nov. 8, 2006, provisional application No. 60/895,025, filed on Mar. 15, 2007.

(51) Int. Cl.
*H02P 9/00* (2006.01)
*F02D 25/00* (2006.01)
*F01C 13/00* (2006.01)
*F01D 15/10* (2006.01)
*F02C 6/00* (2006.01)
*F02D 29/06* (2006.01)
*H02P 9/04* (2006.01)
*H02K 9/06* (2006.01)

(52) U.S. Cl. ................ 322/89; 290/4 R; 310/62; 310/63

(58) Field of Classification Search .............. 322/89; 290/4 R; 310/62–63
See application file for complete search history.

(56) References Cited

U.S. PATENT DOCUMENTS

| | | | |
|---|---|---|---|
| 1,269,537 A | 6/1918 | Holcombe | 310/63 |
| 2,742,582 A | 4/1956 | Bahn et al. | 310/52 |
| 2,783,393 A | 2/1957 | Lindahl et al. | 307/64 |
| 2,920,218 A | 1/1960 | Beckwith | 310/55 |
| 3,439,202 A | 4/1969 | Wanke | 310/52 |

(Continued)

FOREIGN PATENT DOCUMENTS

| | | |
|---|---|---|
| DE | 3305225 | 8/1984 |
| DE | 3932481 | 4/1991 |
| EP | 1 392 981 | 7/2008 |
| FR | 2811155 | 1/2002 |
| WO | WO 02/15367 | 2/2002 |

OTHER PUBLICATIONS

International Search Report and Written Opinion of the International Searching Authority issued in International Application No. PCT/US2007/082541; May 9, 2008; 12 pages.

(Continued)

*Primary Examiner*—T C Patel
*Assistant Examiner*—Pedro J Cuevas
(74) *Attorney, Agent, or Firm*—Fish & Richardson P.C.

(57) ABSTRACT

An exemplary power system may include an electric machine with multiple sets of stator windings, each set of windings being coupled through a separate switch matrix to a common voltage bus, and each of which may be spatially arranged in full pitch around the stator such that stator flux harmonics are substantially reduced. The reduced stator flux harmonics may be associated with phase current harmonic content. In an example application, such power systems may operate in a generating mode to transfer mechanical energy to electrical energy on a DC voltage bus. In some illustrative embodiments, the power system may provide both high-power and high-speed (e.g., 1 MW at 8000 rpm or above) motoring and/or generating capability suitable, for example, for on-board (e.g., marine, aviation, traction) power systems.

23 Claims, 13 Drawing Sheets

U.S. PATENT DOCUMENTS

| | | | |
|---|---|---|---|
| 3,751,699 A | 8/1973 | Gleichman | 310/90 |
| 3,809,934 A | 5/1974 | Baer et al. | 310/53 |
| 3,933,535 A | 1/1976 | Becker | 148/103 |
| 3,955,112 A | 5/1976 | Sell | 310/86 |
| 3,979,619 A | 9/1976 | Whiteley | 310/268 |
| 3,999,092 A | 12/1976 | Whiteley | 310/156.32 |
| 4,025,840 A | 5/1977 | Brissey et al. | 322/52 |
| 4,088,177 A | 5/1978 | Armstrong et al. | 164/109 |
| 4,100,382 A | 7/1978 | Hollitscher | 200/61.46 |
| 4,141,137 A | 2/1979 | De Wolf et al. | 29/596 |
| 4,150,312 A | 4/1979 | Armstrong et al. | 310/154.11 |
| 4,233,960 A | 11/1980 | Johnson | 126/572 |
| 4,259,026 A | 3/1981 | Hanaoka et al. | 400/328 |
| 4,308,479 A | 12/1981 | Richter | 310/156.07 |
| 4,348,604 A | 9/1982 | Thode | 310/62 |
| 4,361,791 A | 11/1982 | Plunkett | 318/723 |
| 4,371,799 A | 2/1983 | De Wolf et al. | 310/154.11 |
| 4,371,801 A | 2/1983 | Richter | 310/156.36 |
| 4,388,545 A | 6/1983 | Honsinger et al. | 310/156.66 |
| 4,405,873 A | 9/1983 | Nondahl | 310/156.56 |
| 4,417,168 A | 11/1983 | Miller et al. | 310/156.52 |
| 4,443,723 A | 4/1984 | Ohkubo | 310/53 |
| 4,443,934 A | 4/1984 | Hickey | 29/593 |
| 4,460,834 A | 7/1984 | Gottfried | 307/64 |
| 4,464,596 A | 8/1984 | Miller et al. | 310/156.52 |
| 4,469,970 A | 9/1984 | Neumann | 310/156.78 |
| 4,472,651 A | 9/1984 | Jones | 310/156.78 |
| 4,476,408 A | 10/1984 | Honsinger | 310/156.84 |
| 4,480,207 A | 10/1984 | Miller et al. | 310/156.52 |
| 4,486,679 A | 12/1984 | Jones | 310/407 |
| 4,506,181 A | 3/1985 | Jones et al. | 310/156.78 |
| 4,510,680 A | 4/1985 | Miller et al. | 29/598 |
| 4,525,925 A | 7/1985 | Jones | 29/598 |
| 4,544,855 A | 10/1985 | Prenner et al. | 310/59 |
| 4,570,333 A | 2/1986 | Jones | 29/598 |
| 4,578,610 A | 3/1986 | Kliman et al. | 310/156.35 |
| 4,649,331 A | 3/1987 | Jahns | 318/798 |
| 4,684,818 A * | 8/1987 | Carlson | 307/10.1 |
| 4,723,188 A | 2/1988 | McMurray | 361/18 |
| 4,759,116 A | 7/1988 | Jones | 29/598 |
| 4,811,375 A | 3/1989 | Klostermann | 378/131 |
| 4,814,677 A | 3/1989 | Plunkett | 318/400.02 |
| 4,857,755 A | 8/1989 | Comstock | 307/47 |
| 4,862,009 A | 8/1989 | King | 290/22 |
| 4,872,307 A | 10/1989 | Nakhamkin | 60/772 |
| 4,888,749 A | 12/1989 | Schwartz et al. | 368/157 |
| 4,912,618 A | 3/1990 | Krinickas | 363/37 |
| 4,916,346 A | 4/1990 | Kliman | 310/257 |
| 4,918,831 A | 4/1990 | Kliman | 29/598 |
| 4,920,293 A | 4/1990 | Kanda | 310/116 |
| 4,928,553 A | 5/1990 | Wagner | 475/268 |
| 4,936,098 A | 6/1990 | Nakhamkin | 60/652 |
| 4,952,852 A | 8/1990 | Bando et al. | 318/140 |
| 5,017,087 A | 5/1991 | Sneddon | 415/72 |
| 5,031,746 A | 7/1991 | Koivunen | 192/85 AA |
| 5,040,286 A | 8/1991 | Stark | 29/598 |
| 5,055,764 A | 10/1991 | Rozman et al. | 322/10 |
| 5,057,697 A | 10/1991 | Hammond et al. | 307/66 |
| 5,081,368 A | 1/1992 | West | 307/67 |
| 5,083,905 A | 1/1992 | Mohn | 417/45 |
| 5,137,286 A | 8/1992 | Whitford | 277/410 |
| 5,144,735 A | 9/1992 | Stark | 29/732 |
| 5,152,679 A | 10/1992 | Kanemitsu et al. | 417/423.4 |
| 5,175,461 A | 12/1992 | Zigler et al. | 310/156.28 |
| 5,179,308 A | 1/1993 | Malsky | 310/90.5 |
| 5,216,308 A | 6/1993 | Meeks | 310/90.5 |
| 5,225,712 A | 7/1993 | Erdman | 290/44 |
| 5,229,650 A | 7/1993 | Kita et al. | 307/66 |
| 5,237,737 A | 8/1993 | Zigler et al. | 29/598 |
| 5,250,867 A | 10/1993 | Gizaw | 310/179 |
| 5,257,872 A | 11/1993 | Morgen et al. | 403/30 |
| 5,280,766 A | 1/1994 | Mohn | 166/368 |
| 5,283,471 A | 2/1994 | Raad | 290/46 |
| 5,288,447 A | 2/1994 | Day | 264/112 |
| 5,309,081 A | 5/1994 | Shah et al. | 322/10 |
| 5,327,069 A | 7/1994 | Radun et al. | 322/10 |
| 5,345,129 A | 9/1994 | Molnar | 310/156.28 |
| 5,345,130 A | 9/1994 | Kliman et al. | 310/156.13 |
| 5,345,669 A | 9/1994 | Zigler et al. | 29/598 |
| 5,348,451 A | 9/1994 | Mohn | 417/390 |
| 5,379,589 A | 1/1995 | Cohn et al. | 60/39.59 |
| 5,398,571 A | 3/1995 | Lewis | 74/572.1 |
| 5,417,544 A | 5/1995 | Mohn | 415/64 |
| 5,434,454 A | 7/1995 | Farkas | 290/4 R |
| 5,491,969 A | 2/1996 | Cohn et al. | 60/775 |
| 5,537,822 A | 7/1996 | Shnaid et al. | 60/659 |
| 5,548,172 A | 8/1996 | Kliman et al. | 310/156.53 |
| 5,552,640 A | 9/1996 | Sutton et al. | 290/40 B |
| 5,563,463 A | 10/1996 | Stark | 310/156.28 |
| 5,602,462 A | 2/1997 | Stich et al. | 323/258 |
| 5,602,957 A | 2/1997 | Wille et al. | 388/836 |
| 5,604,654 A | 2/1997 | Wille et al. | 361/23 |
| 5,610,456 A | 3/1997 | Wille et al. | 310/58 |
| 5,611,516 A | 3/1997 | Reinicke et al. | 251/77 |
| 5,627,744 A | 5/1997 | Baker et al. | 363/165 |
| 5,637,036 A | 6/1997 | Hepworth | 451/364 |
| 5,637,049 A | 6/1997 | Zentmyer et al. | 475/231 |
| 5,640,064 A | 6/1997 | Boyd, Jr. et al. | 310/211 |
| 5,646,458 A | 7/1997 | Bowyer et al. | 307/67 |
| 5,668,429 A | 9/1997 | Boyd, Jr. et al. | 310/216.071 |
| 5,670,838 A | 9/1997 | Everton | 310/216.061 |
| 5,689,174 A | 11/1997 | Pacheco | 322/16 |
| 5,694,026 A | 12/1997 | Blanchet | 322/29 |
| 5,729,118 A | 3/1998 | Yanagisawa et al. | 322/29 |
| 5,759,126 A | 6/1998 | Zentmyer et al. | 475/150 |
| 5,759,129 A | 6/1998 | Zentmyer et al. | 475/231 |
| 5,767,591 A | 6/1998 | Pinkerton | 307/64 |
| 5,769,069 A | 6/1998 | Caffell | 126/634 |
| 5,774,976 A | 7/1998 | Stark | 29/732 |
| 5,783,932 A | 7/1998 | Namba et al. | 322/16 |
| 5,795,135 A | 8/1998 | Nyilas et al. | 417/53 |
| 5,796,194 A | 8/1998 | Archer et al. | 310/68 B |
| 5,811,960 A | 9/1998 | Van Sickle et al. | 322/4 |
| 5,816,971 A | 10/1998 | Zentmyer et al. | 475/84 |
| 5,821,630 A | 10/1998 | Schutten | 290/30 R |
| 5,845,479 A | 12/1998 | Nakhamkin et al. | 60/777 |
| 5,852,338 A | 12/1998 | Boyd, Jr. et al. | 310/89 |
| 5,856,709 A | 1/1999 | Ibaraki et al. | 290/45 |
| 5,859,513 A | 1/1999 | Stephens et al. | 318/430 |
| 5,880,533 A | 3/1999 | Arai et al. | 290/31 |
| 5,881,447 A | 3/1999 | Molnar | 29/598 |
| 5,881,448 A | 3/1999 | Molnar | 29/598 |
| 5,889,659 A | 3/1999 | Emmerich | 363/34 |
| 5,894,182 A | 4/1999 | Saban et al. | 310/216.048 |
| 5,911,453 A | 6/1999 | Boyd, Jr. et al. | 29/596 |
| 5,929,538 A | 7/1999 | O'Sullivan et al. | 307/66 |
| 5,933,339 A | 8/1999 | Duba et al. | 363/71 |
| 5,934,063 A | 8/1999 | Nakhamkin | 60/773 |
| 5,949,173 A | 9/1999 | Wille et al. | 310/220 |
| 5,952,757 A | 9/1999 | Boyd, Jr. | 310/156.81 |
| 5,982,045 A | 11/1999 | Tabata et al. | 290/17 |
| 5,984,173 A | 11/1999 | Edwards | 323/207 |
| 5,986,419 A | 11/1999 | Archer et al. | 318/400.02 |
| 5,990,588 A | 11/1999 | Kliman et al. | 310/86 |
| 5,994,794 A | 11/1999 | Wehrlen | 307/66 |
| 6,002,191 A | 12/1999 | Saban | 310/216.048 |
| 6,011,324 A | 1/2000 | Kohlstruck et al. | 307/64 |
| 6,018,198 A | 1/2000 | Tsuzuki et al. | 290/17 |
| 6,018,207 A | 1/2000 | Saban et al. | 310/216.048 |
| 6,020,657 A | 2/2000 | Liran | 307/64 |
| 6,023,152 A | 2/2000 | Briest et al. | 323/207 |
| 6,025,666 A | 2/2000 | Kliman | 310/156.53 |
| 6,029,336 A | 2/2000 | Kliman et al. | 29/598 |
| 6,046,554 A | 4/2000 | Becerra | 318/400.34 |

| Patent | Type | Date | Inventor | Class |
|---|---|---|---|---|
| 6,059,539 | A | 5/2000 | Nyilas et al. | 417/228 |
| 6,084,330 | A | 7/2000 | Fisher et al. | 310/91 |
| 6,088,905 | A | 7/2000 | Boyd, Jr. et al. | 29/598 |
| 6,098,584 | A | 8/2000 | Ahner et al. | 123/179.3 |
| 6,098,735 | A | 8/2000 | Sadarangani et al. | 180/65.24 |
| 6,104,113 | A | 8/2000 | Beifus | 310/68 B |
| 6,107,693 | A | 8/2000 | Mongia et al. | 290/52 |
| 6,108,206 | A | 8/2000 | Criniti et al. | 361/704 |
| 6,120,620 | A | 9/2000 | Benz et al. | 148/302 |
| 6,133,716 | A | 10/2000 | Schutten | 322/40 |
| 6,142,090 | A | 11/2000 | Jakuba et al. | 114/65 R |
| 6,150,731 | A | 11/2000 | Rinaldi et al. | 290/1 A |
| 6,160,722 | A | 12/2000 | Thommes et al. | 363/37 |
| 6,169,390 | B1 | 1/2001 | Jungreis | 322/4 |
| 6,175,163 | B1 | 1/2001 | Rinaldi et al. | 290/6 |
| 6,175,217 | B1 | 1/2001 | Da Ponte et al. | 322/19 |
| 6,175,495 | B1 | 1/2001 | Batchelder | 361/695 |
| 6,184,593 | B1 | 2/2001 | Jungreis | 307/64 |
| 6,188,139 | B1 | 2/2001 | Thaxton et al. | 290/4 R |
| 6,192,687 | B1 | 2/2001 | Pinkerton et al. | 60/646 |
| 6,198,176 | B1 | 3/2001 | Gillette | 307/64 |
| 6,198,803 | B1 | 3/2001 | Osama et al. | 378/132 |
| 6,204,572 | B1 | 3/2001 | Liran | 307/64 |
| 6,219,623 | B1 | 4/2001 | Wills | 702/60 |
| 6,223,417 | B1 | 5/2001 | Saban et al. | 29/598 |
| 6,232,671 | B1 | 5/2001 | Gottfried, Jr. | 290/1 R |
| 6,239,513 | B1 | 5/2001 | Dean et al. | 307/64 |
| 6,241,486 | B1 | 6/2001 | Sloteman | 417/370 |
| 6,255,743 | B1 | 7/2001 | Pinkerton et al. | 290/40 C |
| 6,261,455 | B1 | 7/2001 | Brown et al. | 210/380.1 |
| 6,278,194 | B1 | 8/2001 | Nakagawa et al. | 290/31 |
| 6,281,595 | B1 | 8/2001 | Sinha et al. | 290/4 A |
| 6,288,456 | B1 | 9/2001 | Cratty | 307/64 |
| 6,296,765 | B1 | 10/2001 | Brown et al. | 210/380.1 |
| 6,320,279 | B1 | 11/2001 | López Jimenez | 307/64 |
| 6,321,539 | B1 | 11/2001 | Bronicki et al. | 60/641.8 |
| 6,324,494 | B1 | 11/2001 | Saban | 703/13 |
| 6,340,851 | B1 | 1/2002 | Rinaldi et al. | 307/82 |
| 6,365,983 | B1 | 4/2002 | Masberg et al. | 290/40 C |
| 6,388,356 | B1 | 5/2002 | Saban | 310/184 |
| 6,397,946 | B1 | 6/2002 | Vail, III | 166/250.01 |
| 6,404,655 | B1 | 6/2002 | Welches | 363/41 |
| 6,411,002 | B1 | 6/2002 | Smith et al. | 310/156.01 |
| 6,437,533 | B1 | 8/2002 | Du et al. | 318/560 |
| 6,445,079 | B1 | 9/2002 | Gale et al. | 290/31 |
| 6,462,976 | B1 | 10/2002 | Olejniczak et al. | 363/147 |
| 6,463,738 | B1 | 10/2002 | Pinkerton et al. | 60/646 |
| 6,488,401 | B1 | 12/2002 | Seaman | 366/168.2 |
| 6,494,042 | B2 | 12/2002 | Bronicki | 60/651 |
| 6,504,337 | B1 | 1/2003 | Saban et al. | 318/727 |
| 6,507,128 | B2 | 1/2003 | King et al. | 290/40 C |
| 6,518,867 | B2 | 2/2003 | Laskaris et al. | 335/299 |
| 6,525,634 | B2 | 2/2003 | Laskaris et al. | 335/296 |
| 6,557,642 | B2 | 5/2003 | Head | 166/381 |
| 6,559,559 | B2 | 5/2003 | Cratty | 307/64 |
| 6,563,229 | B2 | 5/2003 | Farkas | 290/30 A |
| 6,573,626 | B1 | 6/2003 | Gosebruch et al. | 310/74 |
| 6,596,096 | B2 | 7/2003 | Carl et al. | 148/101 |
| 6,614,132 | B2 | 9/2003 | Hockney et al. | 307/43 |
| 6,624,542 | B1 | 9/2003 | Gabrys et al. | 310/54 |
| 6,628,012 | B2 | 9/2003 | Reuter | 307/68 |
| 6,655,830 | B1 | 12/2003 | Seaman | 366/168.2 |
| 6,657,321 | B2 | 12/2003 | Sinha | 307/68 |
| 6,662,434 | B2 | 12/2003 | Laskaris et al. | 29/607 |
| 6,700,214 | B2 | 3/2004 | Ulinski et al. | 290/40 C |
| 6,700,233 | B2 | 3/2004 | Cordiale | 310/24 |
| 6,707,169 | B2 | 3/2004 | Shimizu et al. | 290/40 C |
| 6,710,579 | B2 | 3/2004 | Ebel et al. | 322/4 |
| 6,727,600 | B1 | 4/2004 | Abdurachmanov | 290/54 |
| 6,737,762 | B2 | 5/2004 | Koenig | 307/48 |
| 6,744,240 | B2 | 6/2004 | Koelle et al. | 322/20 |
| 6,748,977 | B2 | 6/2004 | Berto | 137/628 |
| 6,753,619 | B2 | 6/2004 | Stevenson et al. | 290/1 R |
| 6,777,847 | B1 | 8/2004 | Saban et al. | 310/211 |
| 6,787,931 | B2 | 9/2004 | Nakagawa et al. | 290/31 |
| 6,788,029 | B1 * | 9/2004 | Gabrys | 322/4 |
| 6,813,328 | B2 | 11/2004 | Kitch et al. | 376/406 |
| 6,825,666 | B2 | 11/2004 | Aksel et al. | 324/319 |
| 6,844,706 | B2 | 1/2005 | Pinkerton, III et al. | 322/29 |
| 6,868,906 | B1 | 3/2005 | Vail, III et al. | 166/250.01 |
| 6,879,053 | B1 | 4/2005 | Welches et al. | 290/6 |
| 6,883,328 | B2 | 4/2005 | Bronicki | 60/670 |
| 6,934,666 | B2 | 8/2005 | Saban et al. | 703/2 |
| 6,967,461 | B1 | 11/2005 | Markunas et al. | 318/700 |
| 6,969,922 | B2 | 11/2005 | Welches et al. | 290/1 A |
| 6,991,362 | B1 | 1/2006 | Seaman | 366/168.2 |
| 6,998,724 | B2 | 2/2006 | Johansen et al. | 290/1 R |
| 7,023,309 | B2 | 4/2006 | Laskaris et al. | 335/306 |
| 7,042,108 | B2 | 5/2006 | Farkas | 290/3 |
| 7,053,743 | B2 | 5/2006 | Laskaris et al. | 335/298 |
| 7,071,581 | B2 | 7/2006 | Eisenhaure et al. | 307/64 |
| 7,075,399 | B2 | 7/2006 | Saban et al. | 336/60 |
| 7,093,661 | B2 | 8/2006 | Olsen | 166/357 |
| 7,105,964 | B2 | 9/2006 | Miyazaki et al. | 310/75 R |
| 7,108,095 | B1 | 9/2006 | Washington et al. | 180/165 |
| 7,129,593 | B2 | 10/2006 | King et al. | 290/4 C |
| 7,137,450 | B2 | 11/2006 | Johansen et al. | 166/316 |
| 7,148,689 | B2 | 12/2006 | Huang et al. | 324/319 |
| 7,156,183 | B2 | 1/2007 | Williams | 166/386 |
| 7,156,627 | B2 | 1/2007 | Lenderink et al. | 417/423.8 |
| 7,208,854 | B1 | 4/2007 | Saban et al. | 310/61 |
| 7,218,195 | B2 | 5/2007 | Laskaris et al. | 335/300 |
| 7,226,277 | B2 | 6/2007 | Dooley | 417/356 |
| 7,227,273 | B2 | 6/2007 | Ahmad et al. | 290/40 C |
| 7,228,616 | B2 | 6/2007 | Stephens | 29/598 |
| 7,230,344 | B2 | 6/2007 | Pollack et al. | 290/40 C |
| 7,256,526 | B1 | 8/2007 | Perkins et al. | 310/216.102 |
| 7,265,463 | B2 * | 9/2007 | Kusase et al. | 310/62 |
| 7,287,595 | B2 | 10/2007 | Johansen et al. | 166/312 |
| 7,313,840 | B2 | 1/2008 | Watkins | 15/103 |
| 7,330,012 | B2 | 2/2008 | Ahmad et al. | 318/811 |
| 7,345,560 | B2 | 3/2008 | Laskaris et al. | 335/284 |
| 7,358,620 | B2 | 4/2008 | Melfi | 290/1 A |
| 7,385,372 | B2 | 6/2008 | Ahmad et al. | 318/811 |
| 7,400,052 | B1 | 7/2008 | Badger | 90/1 A |
| 7,407,371 | B2 | 8/2008 | Leone et al. | 417/423.15 |
| 7,423,431 | B2 | 9/2008 | Amm et al. | 324/319 |
| 7,438,538 | B2 | 10/2008 | Dooley | 417/423.1 |
| 7,471,009 | B2 | 12/2008 | Davis et al. | 290/54 |
| 7,479,757 | B2 | 1/2009 | Ahmad | 318/811 |
| 7,521,835 | B2 | 4/2009 | Qu et al. | 310/184 |
| 7,541,705 | B2 | 6/2009 | Shah et al. | 310/68 C |
| 7,568,896 | B2 | 8/2009 | Dooley | 417/356 |
| 7,573,144 | B1 * | 8/2009 | Saban et al. | 290/4 R |
| 7,573,168 | B2 | 8/2009 | Carl, Jr. et al. | 310/156.08 |
| 2002/0171526 | A1 | 11/2002 | Laskaris et al. | 336/110 |
| 2002/0180573 | A1 | 12/2002 | Laskaris et al. | 335/299 |
| 2003/0070729 | A1 | 4/2003 | Carl et al. | 148/104 |
| 2003/0074165 | A1 | 4/2003 | Saban et al. | 703/2 |
| 2003/0085787 | A1 | 5/2003 | Laskaris et al. | 335/299 |
| 2003/0090354 | A1 | 5/2003 | Laskaris et al. | 335/299 |
| 2004/0074083 | A1 | 4/2004 | Laskaris et al. | 29/607 |
| 2004/0119473 | A1 | 6/2004 | Aksel et al. | 324/318 |
| 2004/0189429 | A1 | 9/2004 | Saban et al. | 336/57 |
| 2005/0062572 | A1 | 3/2005 | Marte et al. | 335/299 |
| 2005/0068138 | A1 | 3/2005 | Amm et al. | 335/296 |
| 2005/0068140 | A1 | 3/2005 | Huang et al. | 335/302 |
| 2005/0073383 | A1 | 4/2005 | Laskaris et al. | 336/200 |
| 2005/0104460 | A1 * | 5/2005 | Kusase et al. | 310/63 |
| 2005/0276020 | A1 | 12/2005 | Ahmad | 361/689 |
| 2006/0001318 | A1 | 1/2006 | Ahmad et al. | 307/10.1 |
| 2006/0001319 | A1 | 1/2006 | Ahmad et al. | 307/10.1 |
| 2006/0001397 | A1 | 1/2006 | Ahmad et al. | 318/801 |
| 2006/0208595 | A1 | 9/2006 | Bradfield | 310/179 |
| 2007/0018516 | A1 | 1/2007 | Pal et al. | 310/61 |
| 2007/0090711 | A1 | 4/2007 | Carl, Jr. et al. | 310/156.48 |

| | | | |
|---|---|---|---|
| 2007/0241699 A1 | 10/2007 | Osada et al. | 318/141 |
| 2008/0103632 A1* | 5/2008 | Saban et al. | 700/286 |
| 2008/0157622 A1 | 7/2008 | Shah et al. | 310/184 |
| 2008/0224551 A1 | 9/2008 | Saban et al. | 310/54 |
| 2008/0238217 A1 | 10/2008 | Shah et al. | 310/11 |
| 2008/0238220 A1 | 10/2008 | El-Rafaie et al. | 310/48 |
| 2008/0238233 A1 | 10/2008 | El-Rafai et al. | 310/154.01 |
| 2008/0238234 A1 | 10/2008 | Saban et al. | 310/156.28 |
| 2009/0009012 A1 | 1/2009 | Stephens et al. | 310/54 |
| 2009/0200809 A1* | 8/2009 | Saban et al. | 290/4 R |
| 2009/0218977 A1 | 9/2009 | Pan et al. | 318/445 |
| 2009/0232664 A1 | 9/2009 | Qu et al. | 417/44.1 |

OTHER PUBLICATIONS

Ahmad, Raed A., "On-Board Electrical Network Topology Using High Speed Permanent Magnet Generators", ESTS, 2007 (7 pages).

Baran, M. E. et al., "DC Distribution for Industrial Systems: Opportunities And Challenges," IEEE Trans. Industry Applications, vol. 39, No. 6, pp. 1596-1601, Nov. 2003.

Davey, K. R. et al., "High Speed Generator Trade Study," presented at Electric Machine Technology Symposium, Pennsylvania, U.S.A., 2006.

Direct Drive Systems—Press Release entitled: "Direct Drive Systems Technology Demonstrations", printed May 10, 2007 from <http://www.directdrivesystems.net/about-news-details.asp?article_ID=27> (1 page).

Direct Drive Systems Article entitled: "Permanent Magnet Machines—Packing Enormous Power into Very Small Spaces" dated Oct. 31, 2006 from <http://www.directdrivesystems.net/tech-perm-machine.asp> (1 page).

Direct Drive Systems Article entitled: "Power Electronics—VFDs and Inverters" dated Oct. 31, 2006 from <http://www.directdrivesystems.net/tech-power-electronics.asp> (1 page).

Erickson, R.W., "Some Topologies Of High Quality Rectifiers," First International Conference on Energy, Power, and Motion Control, Tel Aviv, Israel, May 5-6, 1997. (6 pages).

Fast Recovery Diode, Technical Information—DYNEX, Jan. 2004. (8 pages).

IEEE document entitled: "Draft Performance Standard for Medium Voltage Adjustable Speed AC Drive Systems Rated Over 375 KW (500 HP)", IEEE Standards, Dec. 2004, copyright 2004 Institute of Electrical and Electronics Engineers, Inc., (41 pages).

IGBT-Module, Technical Information—DD400S33K2C, EUPEC, Jun. 13, 2003. (5 pages).

Karlsson, P. et al., "DC Bus Voltage Control For A Distributed Power System," IEEE Trans. Power Electronics, vol. 18, No. 6, pp. 1405-1412, Nov. 2003.

Kelley, A.W. et al., "Rectifier Design For Minimum Line-Current Harmonics And Maximum Power Factor," IEEE Transactions on Power Electronics, vol. 7, No. 2, Apr. 1992. (10 pages).

Moore, Jeff, et al., Presentation entitled "IEMDC—Inline Electric Motor Driven Compressor", GMRC Conference, Salt Lake City, Utah, Oct. 5, 2003, (55 pages).

Oriti, G. et al., "Ship Propulsion AC/DC Conversion System Modeling And Design," IEEE, 1-4244-0365-0/06, 2006. (7 pages).

Shade, Norm "Enormous Power in a Small Package—Direct Drive Systems Introduces High-Speed Motors for Compression Applications", Jan.-Feb. 2006, Compressor Tech Two (3 pages).

Smith, J. S. et al., "Design, Manufacture, And Testing Of A High Speed 10MW Permanent Magnet Motor And Discussion Of Potential Applications," in Proc. 2006 The 35$^{th}$ Turbomachinery Symposium, pp. 19-24.

Toliyat, H.A. et al., "Analysis And Simulation Of Five-Phase Synchronous Reluctance Machines Including Third Harmonic Of Airgap MMF," IEEE Transactions on Industry Applications, vol. 34, No. 2, Mar./Apr. 1998. (9 pages).

Van der Veen, J.L.F. et al., "Minimising Rotor Losses In High-Speed High-Power Permanent Magnet Synchronous Generators With Rectifier Load," IEE Proc.-Electr. Power Appl., vol. 144, No. 5, Sep. 1997 (7 pages).

Weeber, K.; Stephens, C; Vandam, J.; Yagielski, J; Gravame, A.; Messervey, D.; High-Speed Permanent Motors For The Oil & Gas Industry, Proceedings of GT 2007 ASME Turbo Expo 2007: Power For Land, Sea And Air, May 14-17, 2007, Montreal Canada; 2007 Copyright by ASME. (10 pages).

Bailey, Cassandra; Saban, Daniel, Guedes-Pinto, Paulo; Design Of High-Speed Direct-Connected Permanent-Magnet Motors And Generators For The Petrochemical Industry, IEEE Transactions On Industry Applications, vol. 45, No. 3, May/Jun. 2009 (pp. 1159-1165). (7 pages).

Saban, Daniel; Bailey, Cassandra; Gonzalez-Lopez, Delvis; Luca, Ladislau, Experimental Evaluation Of A High-Speed Permanent Magnet Machine, IEEE Paper No. PCIC-(), 2008 (Publication Date And Reference Obtained Online At http://www.directdrivesystems.net/tech-papers.asp). (9 pages).

Saban, Daniel; Artinian, Herman; Permanent-Magnet Motors For Sub-Sea Applications, 2008 (Publication Date and Reference Obtained Online At http://www.directdrivesystems.net/techpapers.asp). (8 pages).

Pan, Zhiguo "Zach"; Ahmad, Raed; Saban, Daniel M., Space-Shifted Split-Phase High-Speed Motor/Converter Topology With Fault-Tolerance Capability; IEEE, 2008. (7 pages).

Saban, Daniel; Lipo, Thomas A.; Hybrid Approach For Determining Eddy-Current Losses In High-Speed PM Rotors, IEEE Xplore, 2007 (pp. 658-661). (4 pages).

Millward, Brian; Practical Challenges Of Manufacturing A 2500 kW Subsea Motor; Hayward Tyler Engineered Products, 2007. (15 pages).

Saban, Daniel; Eddy-Current Losses In The Sleeves Of High-Speed Synchronous Permanent-Magnet Machines, Dissertation submitted in partial fulfillment of requirements for degree of Doctor Of Philosophy (Electrical Engineering), University of Wisconsin-Madison 2006. (234 pages).

Bailey, Cassandra; Saban, Daniel M.; Guedes-Pinto, Paulo; Design Of High-Speed, Direct-Connected, Permanent-Magnet Motors And Generators For The Petrochemical Industry, IEEE Paper No. PCIC-2007-26, 2007. (5 pages).

Littlefield, Andrew; Hyland, Edward; Prestressed Carbon Fiber Composite Overwrapped Gun Tube, US Army RDECOM-ARDEC Benet Laboratories, Nov. 2006 (Publication Date Obtained online at <http://www.stormingmedia.us/56/5601/A560184.html>. (7 pages).

Notification of Transmittal Of The International Preliminary Report On Patentability (1 page); International Preliminary Report On Patentability (5 pages); all issued in PCT International Application No. PCT/US2007/082541; all mailed on Oct. 9, 2008 (Total 6 pages).

IEEE Guide For The Design And Application Of Power Electronics In Electrical Power Systems on Ships, IEEE P1662; IEEE Industry Applications Society 2008, Mar. 19, 2009 (65 pages).

Direct Drive Systems, High Speed, High Power Permanent Magnet Motors & Generators, publicly available on or about Aug. 24, 2007 (4 pages).

* cited by examiner

740 ⇘

780 ⇘

ELECTROMECHANICAL ENERGY CONVERSION SYSTEMS

CROSS-REFERENCE TO RELATED APPLICATIONS

This application claims priority to: U.S. Provisional Patent Application 60/863,233 entitled "Energy Conversion System" by Ahmad, et al., filed on Oct. 27, 2006; U.S. Provisional Patent Application 60/864,882 entitled "Energy Conversion System" by Ahmad, et al., filed on Nov. 8, 2006; and U.S. Provisional Patent Application 60/895,025 entitled "High-Speed, Sleeved Rotor for Permanent Magnet Electric Machines" by Saban, et al., filed on Mar. 15, 2007. The disclosures of the figures and detailed description portions of each of the three priority documents are incorporated herein by reference.

TECHNICAL FIELD

Various embodiments relate to motoring and/or generating systems. Some exemplary embodiments may be used, for example, in on-board applications capable of high speed and/or high power operations.

BACKGROUND

Some power systems may convert mechanical energy into electrical energy and/or convert electrical energy into mechanical energy. For example, generating systems can include a prime mover and an electromechanical element, such as an electric machine, that can convert mechanical energy into electrical energy. Similarly, motoring systems can include a mechanical load coupled to an electric machine. Such systems typically include passive or actively controlled power electronic devices to process the electrical energy (e.g., by converting AC (alternating current) to DC (direct current) or vice versa). In addition, such systems can use transformers for isolation or for matching voltage levels in different sections of an electrical distribution network.

SUMMARY

An exemplary power system may include an electric machine with multiple sets of stator windings, each set of windings being coupled through a separate switch matrix to a common voltage bus, and each of which may be spatially arranged in full pitch around the stator such that stator flux harmonics are substantially reduced. The reduced stator flux harmonics may be associated with phase current harmonic content. In an example application, such power systems may operate in a generating mode to transfer mechanical energy to electrical energy on a DC voltage bus. In some illustrative embodiments, the power system may provide both high-power and high-speed (e.g., 1 MW at 8000 rpm or above) motoring and/or generating capability suitable, for example, for on-board (e.g., marine, aviation, traction) power systems.

In various embodiments, stator windings in the electric machine may be connected to substantially reduce or cancel the effect of time-harmonic currents from the power electronics including harmonic orders that are a function of the number of sets of phase windings (N), the number of phases (M) in each set of winding, and switching frequency of the devices in the power-electronics converter. For a given stator winding configuration in the machine, air-gap flux harmonics may be reduced for generating operations, for example. These embodiments, while increasing the cost and complexity of the machine's stator, decrease the cost of the drive with an overall cost reduction of the system and improvement to the overall system performance.

In some electrical power generation examples, an AC voltage from each M-phase winding set is rectified by a corresponding switch matrix, which may be, for example, an M-phase passive bridge rectifier or an actively controlled power electronic converter with controlled switching elements. In a generating mode of operation, the rectified output signals from each of the switch matrices may be arranged in parallel, series, or a combination thereof, for connection to the common voltage bus. In some embodiments, the electrical machine may have a permanent magnet rotor, and the machine may be configured as a rotating machine or as a linear machine.

Certain embodiments may provide one or more advantages. For example, some embodiments may include passive rectifiers, such as diode bridges, which may have substantially reduced power losses. The average current handled by each of the switch matrices and each winding may be substantially reduced, for example, which may further lower the necessary device ratings. Moreover, some embodiments may provide improved distribution of power losses across multiple devices. Such reduced ratings considerations may enable, for example, use of lower cost, more widely available switching devices, reduced thermal management costs (e.g., active cooling, heat sinks, or the like). Such benefits may further yield substantial savings in design, manufacturing, assembly, and component costs.

For some electric power generating systems, simple passive (e.g., uncontrolled) low cost rectifier devices may be used in some implementations to obtain advantages that include substantially reduced cost, size, weight, and higher reliability and efficiency. Furthermore, substantially reducing harmonic flux may advantageously reduce power loss in a rotor of the electrical machine by reducing harmonic energy that may couple to the rotor. In various embodiments, AC machine modular layout and structure may simplify high-speed high-power AC drive design for similar or lower cost, and may advantageously provide improved reliability, for example, by reducing cost of redundant implementations.

Other features and advantages will be apparent from the description and drawings, and from the claims. The details of various embodiments are set forth in the accompanying drawings and the description below.

DETAILED DESCRIPTION OF ILLUSTRATIVE EXAMPLES

Figure 1A:
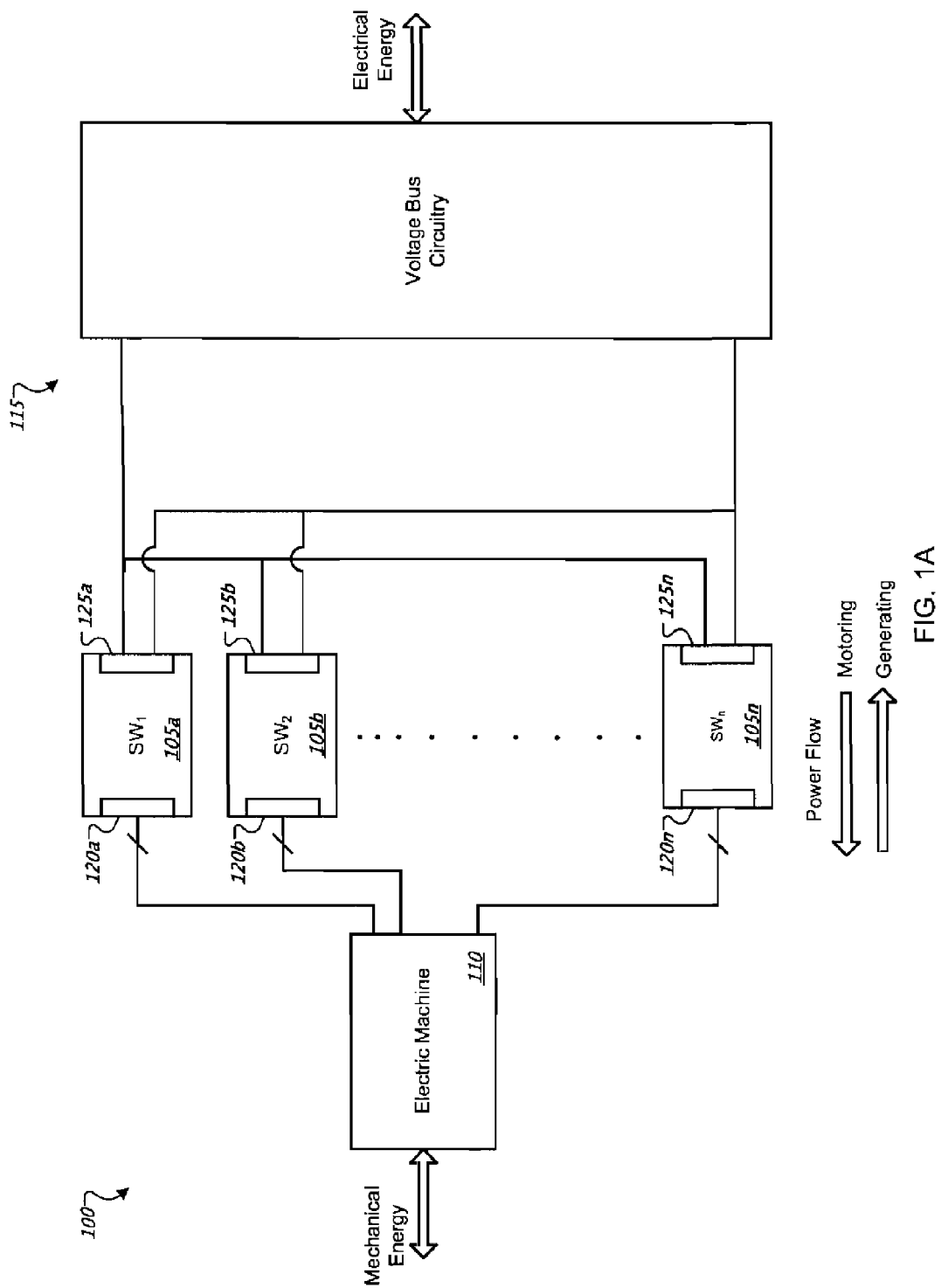
FIGS. 1A-1B shows schematic representations of exemplary power stages.
Figure 1B:
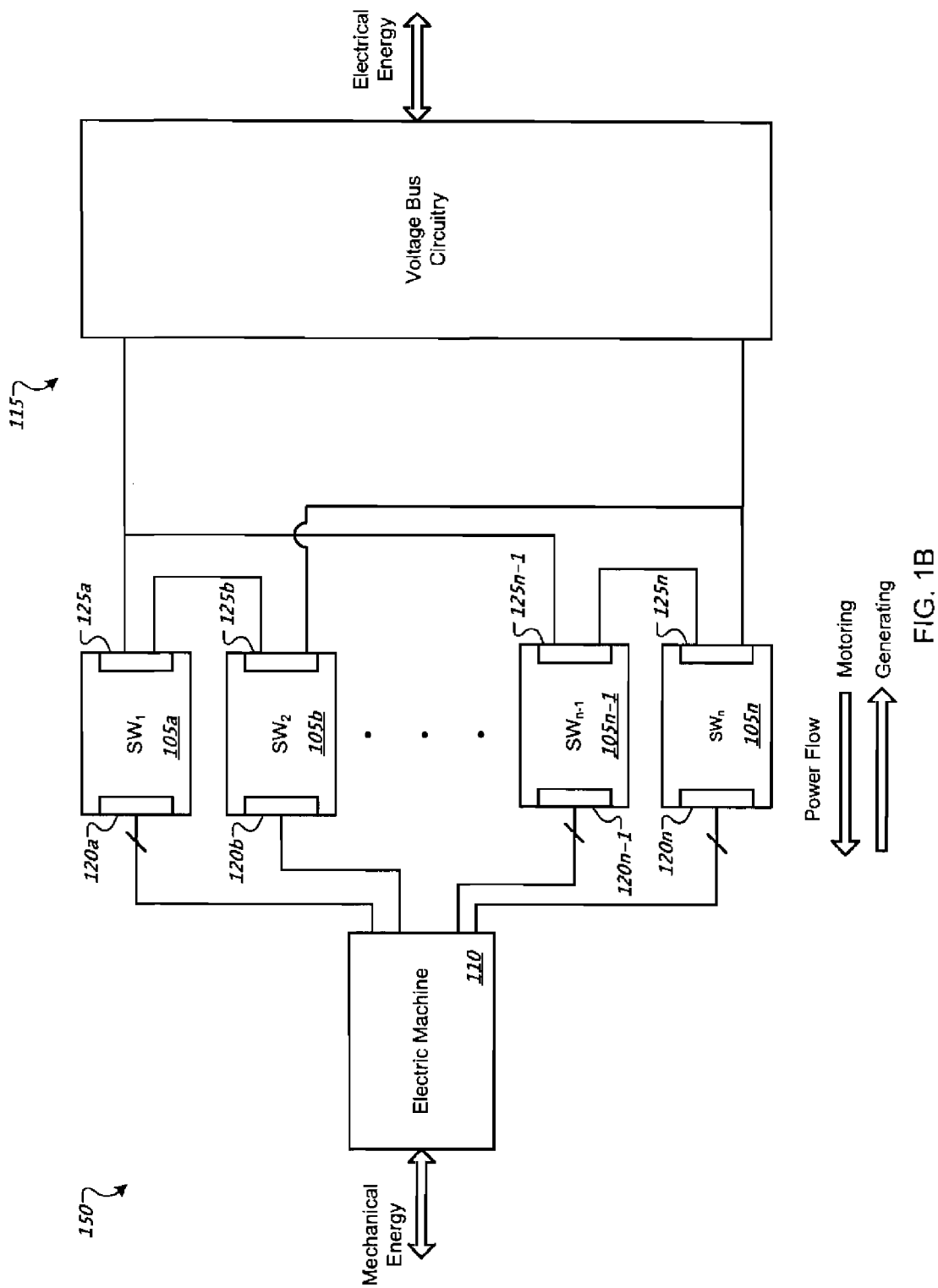

FIGS. 1A-1B show exemplary systems capable of converting mechanical energy to electrical energy (e.g., high power DC generation) or electrical energy to mechanical energy (e.g., high-speed motoring applications). As shown in FIG. 1A, a system 100 includes a bank of a number (N) of switch matrices 105a-105n, an electric machine 110, and a voltage bus 115. Each of the switch matrices 105a-105n may include an M-phase inverter for motoring, and/or an M-phase diode bridge for generation. Each of the switch matrices 105a-105n includes a port 120a-120n, respectively, each of the ports 120a-120n including a set of terminals (not shown) for connecting to one of N corresponding sets of stator windings on the electric machine 110. In some embodiments, one or more of the ports 120-120n may include one or more terminals for connection to a neutral point associated with the windings in the winding set in the machine (e.g., for an open delta-configured winding). Each of the switch matrices 105a-105n also includes a port 125a-125n, respectively, each of the ports 125a-125n including a pair of terminals for connecting to the voltage bus 115.

The machine 110 includes a stator (not shown) that has N sets of windings. For example, the electric machine 110 can include a linear machine. In another example, the electric machine 110 can include a rotating machine. In various applications, the system 100 may receive mechanical energy and output electrical energy when operating as a generator, and/or the system may receive electrical energy and output mechanical energy when operating as a motor.

In various embodiments, the N sets of windings in the machine 110 are each phase-shifted from each other such that multiple stator current harmonics are substantially reduced during operation of the system 100. The number of harmonics that are substantially reduced is a function of M, the number of phases in each set of windings, and N, the number of sets of windings.

In some examples (e.g., with two winding layers), the number of multiphase (M) winding sets (N) possible for a certain stator configuration may be calculated by:

$$N = \text{\# stator slots}/(M. \text{\# of poles})$$

Various embodiments may substantially reduce or cancel harmonics based on the number of sets of windings (e.g., the number of coils per pole). In one embodiment, a 48 slot stator may use, by way of example and not limitation, N=2, or N=4. Various examples may have various numbers of coils per pole, winding layers, number of phases, stator slots, and the like. The first harmonic components that are not substantially reduced or canceled, as a function of the number of sets of windings (N), may be (6N+/−1) for a three-phase (M=3) system. The phase shift, as a function of the number of phases (M) and the number of sets of windings (N), is pi/(M*N).

Each of the N sets of windings is connected to a corresponding one of the ports 120a-120n. Within the machine 110, each of the sets of windings is electrically isolated from the other windings. When motoring, energy is separately delivered from the voltage bus 115 to each set of windings through the corresponding switch matrix 105a-105n. When generating, energy is separately supplied from each set of windings through the corresponding switch matrix 105a-105n to the voltage bus 115.

In various implementations, a voltage on the bus 115 may be substantially unipolar. The voltage bus 115 includes a positive rail (e.g., node) that connects to a positive terminal of each of the ports 125a-125n, and a negative rail (e.g., node) that connects to a negative terminal of each of the ports 125a-125n. The voltage bus 115 receives a DC voltage from the switch matrices 105a-105n. In some implementations, the switch matrices 105a-105n may invert the unipolar voltage on the voltage bus 115. For example, each of the switch matrices 105a-105n can invert the voltage using an M-phase inverter.

In certain implementations, the switch matrices 105a-105n use the inverted voltage to supply an AC waveform to drive each of the corresponding M-phase windings in the machine 110. The switch matrices 105a-105n may be coordinated, for example, to provide controlled current, voltage, torque, speed, and/or position, for example. Switches in the switch matrices may be operated, in some examples, at or near the fundamental electrical frequency supplied to the machine, or at a frequency substantially above the fundamental frequency. Techniques for controlling switches in the switch matrices may include, but are not limited to, vector control, field-oriented control, phase control, peak current control average current control, and/or pulse width modulation, or combinations of these or other techniques.

In some systems, switching frequency may be based on factors, such as the output fundamental frequency, the harmonic levels required in the line current, load impedance, type of semiconductor device and drive topology used, for example. In general, switching losses may be, for example, directly related to switching frequency. A maximum junction temperatures or safe operating area may typically be specified in the manufacturer's data sheets.

Supplying high power (e.g., 1 Megawatt or more) in high speed applications (e.g., 8000 rpm or above) can present various practical challenges to the design of AC machines and the associated drive electronics. In designing such systems, one challenge involves losses associated with stator harmonic currents. For example, the stator harmonic currents can cause extra copper and iron losses in the stator core. In some examples, the stator harmonic current may also inject harmonic components into the air gap magnetic field that couples into the rotor, increasing losses in the rotor. The system 100 mitigates the harmonic currents by utilizing a phase shift related to the number of sets of winding (n) and the number of phases (m) in each set of winding. In one example, the system 100 reduces the harmonic components in the harmonic currents up to the (6n+/−1) component (e.g., for n=4, the first harmonic component in the harmonic currents would be the 23rd and the 25th components).

Accordingly, the voltage ripple frequency on the voltage bus 115 may be at ($6Nf_{max}$), where $f_{max}$ is the maximum output frequency of the electric machine. Typically, $f_{max}$ is in the kilohertz range for a high speed machine. In some examples, the quality of the voltage bus 115 is improved without using high frequency switching insulated gate bipolar transistors (1 GBTs) or with substantially reduced filtering.

A drive and machine may be considered as a system. Design criteria may typically include matching the machine and the drive together. In some cases, the drive cost may exceed the actual machine and hence optimizing the overall system based on the AC drive or power electronics may be the most cost effective approach.

In some embodiments, the switch matrices 105a-105n can be connected in combinations of series and/or parallel to interface to the voltage bus 115. As shown in FIG. 1B, a system 150 includes the switch matrices 105a-105n to be connected as a series combination of pairs of paralleled switch matrices. For example, the switch matrix 105a is connected in series with the switch matrix 105b, and the switch matrix 105n-1 is connected in series with the switch matrix 105n. In this example, groups of the series connected switch matrices 105a-105n are connected in parallel to interface with the voltage bus 115.

Figure 2:
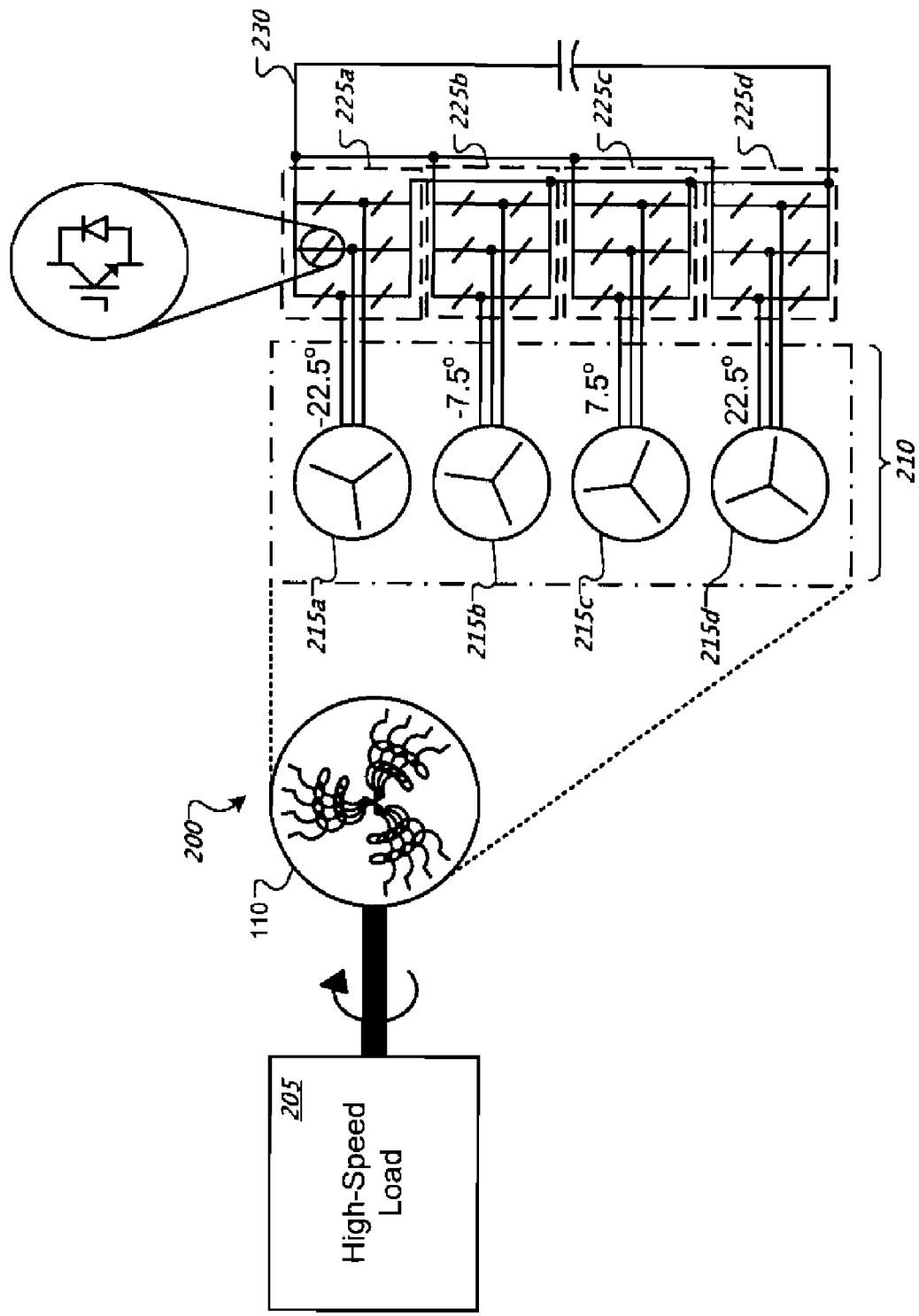
FIG. 2 shows a schematic representation of an exemplary power stage operating in a motoring mode to supply torque to a high-speed load.

FIG. 2 a schematic representation of an exemplary power stage 200 operating in a motoring mode to supply torque to a high-speed load 205. For example, the power stage 200 can be used to power centrifugal compressor drives, integral hermetically sealed compressor drives, high speed blowers, and/or test beds for turbo components. In one example, the power stage 200 may include a space-shifted, split-phase motor and drive system with N=4. In the depicted example, the power stage 200 includes four winding sets 215a, 215b, 215c, 215d. Each of the windings 215a-d is configured to have a 15° phase difference from adjacent windings. In some implementations, the power stage 200 can include 2-level drives feeding from a common DC node 230.

In the depicted example, the electric machine 110 may be an asynchronous or a synchronous machine (e.g., a permanent magnet synchronous machine). The stator of the machine can include space-shifted, split-phase windings, with a total number of phases=3*N, where N is the number of independent, isolated neutral, three phase winding sets. In certain implementations, N may be selected based on the number of slots in the stator, number of rotor poles, and the amount of harmonic cancellation required. There can be a ($\pi/3N$) electrical phase difference between adjacent three phase windings. Similar stator structure and winding layout considerations may be applied for motoring and generating applications.

In the foregoing example, the three phase winding sets 215a-d may be fed by three-phase inverter switch matrices 225a, 225b, 225c, 225d, respectively. In a generation application, the three phase winding sets 215a-d may feed AC-DC converter switch matrices, 225a-d, respectively. In some examples, each of the AC-DC converters may be a six-pulse diode bridge. N inverter cells can be connected in parallel at the input and fed from a main DC link. In another embodiment, each inverter cell may have an individual DC link, yielding N separate DC links. In another implementation, each inverter cell can include an n-level DC-AC converter that utilizes zero voltage vector injection, fed from an isolated three-phase supply through a three phase passive or active rectifier. The rectifier, DC link section and the n-level converter may represent one of these N inverter cells.

In an illustrative example, switching of inverter cells may be synchronized with the corresponding stator windings that are being fed. The fundamental output waveform of each inverter cell may be phase shifted by ($\pi/3N$) from an adjacent inverter cell. Because of the layout of the stator windings, some harmonics can be substantially reduced or cancelled. In some examples, each inverter cell may switch at an output fundamental frequency, or very close to it, and still substantially reduce the level of harmonics in the motor currents.

Some embodiments may yield one or more advantages. For example, some systems may have reduced weight and volume of the machine because of the higher fundamental frequency when using standard AC converter topologies and cooling methods. In some embodiments, output capabilities of the Ac drive components, such as the semiconductor devices, may be increased by using low switching frequency while still maintaining low harmonic distortion in the line current. Optimized stator size may be obtained based on reduced requirements to handle switching harmonic losses that may be associated with higher frequency PWM inverter operation or with use of only one three-phase diode bridge. Harmonic coupling/heating into the rotor may be substantially reduced. Modular design on the power converter may provide substantial fault tolerance in some embodiments, which may yield improved redundancy and higher availability. Stress on the stator winding insulation may be reduced, and/or insulation voltage level of the windings may be reduced by making different connections to the number of turns per coil and the number of coils per pole. Some embodiments may achieve generally high system efficiency and lower overall cost. Some embodiments may not need PWM control techniques, and/or may provide gear-less high-speed AC converter systems.

Figure 3:
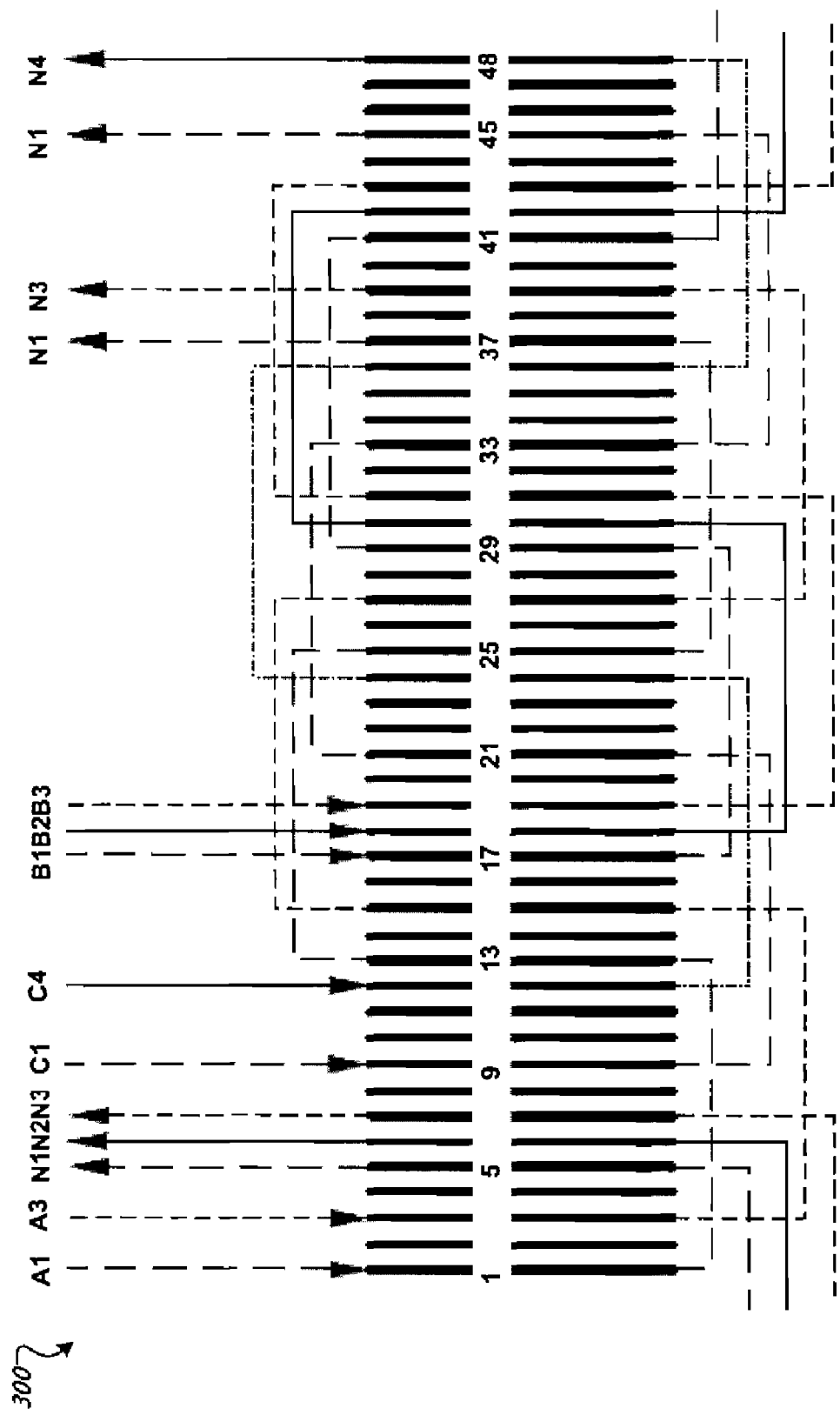
FIG. 3 shows an exemplary diagram of a stator winding configuration in an electric machine.

FIG. 3 shows an exemplary stator-winding configuration 300 of the electric machine 110. In some examples, the winding configuration 300 can be used in a 48 slot/4 pole stator. In the depicted configuration representation, the configuration 300 includes 48 slots as represented by the vertical lines. Some slot numbers associated with their corresponding slots are presented as numbers overlay on the vertical lines.

In some embodiments, the stator configuration 300 can split the N slots separately. In one example, the stator includes a series of tooth structures that is separated by N slots. For example, N phases can be inserted in those N slots (A1, A2, A3 . . . AN) of the stator configuration 300. The stator configuration 300 may then include N sets of three phase windings. In some examples, each winding set can include a single turn coil running in full pitch on the stator. In other examples, each winding set can include multi turn coil running in full pitch on the stator.

In some embodiments, the slot opening dimensions may be substantially equal. For example, the tooth widths may be substantially equal. In other embodiments, the stator configuration 300 can include toothless stator designs (e.g., toroidal windings), such as when the winding is formed substantially in the stator core material.

In the depicted example, the configuration 300 includes 4 slots per pole. In one example, the stator configuration 300 can include equal number of slots in each of the poles. For example, each pole of the stator may include 12 slots. The configuration 300 splits the 12 slots of each pole separately. For example, three phases (m=3) can be inserted in the 12 slots of the stator. As a result, the stator may be configured to have 4 sets of three phase windings (e.g., n=4). In some embodiments, the windings can be distributed such that each slot contains only one phase. In the depicted example, phase A of winding 1 (A1) occupies slots 1, 13, 25, 37, and phase A of winding 2 (A2) occupies slots 2, 14, 26, 38.

Although several examples are described as having particular numbers of slots, phases, turns, poles, and the like, such examples are given by way of example and not limitation, as other configurations are contemplated.

In some examples, the configuration 300 can substantially mitigate harmonics in the stator iron and in an air gap between the stator and the rotor. For example, the configuration 300 can substantially reduce an impact of the 5th and 7th harmonic components in the phase currents on the generator from an iron loss and torque ripple standpoint. In the depicted example, the first non-cancelled harmonic components in the air gap flux can be at (6N±1). In some embodiments, the first non-cancelled harmonic flux components in the machine may be at 2*M*(N±1).

Figure 4:
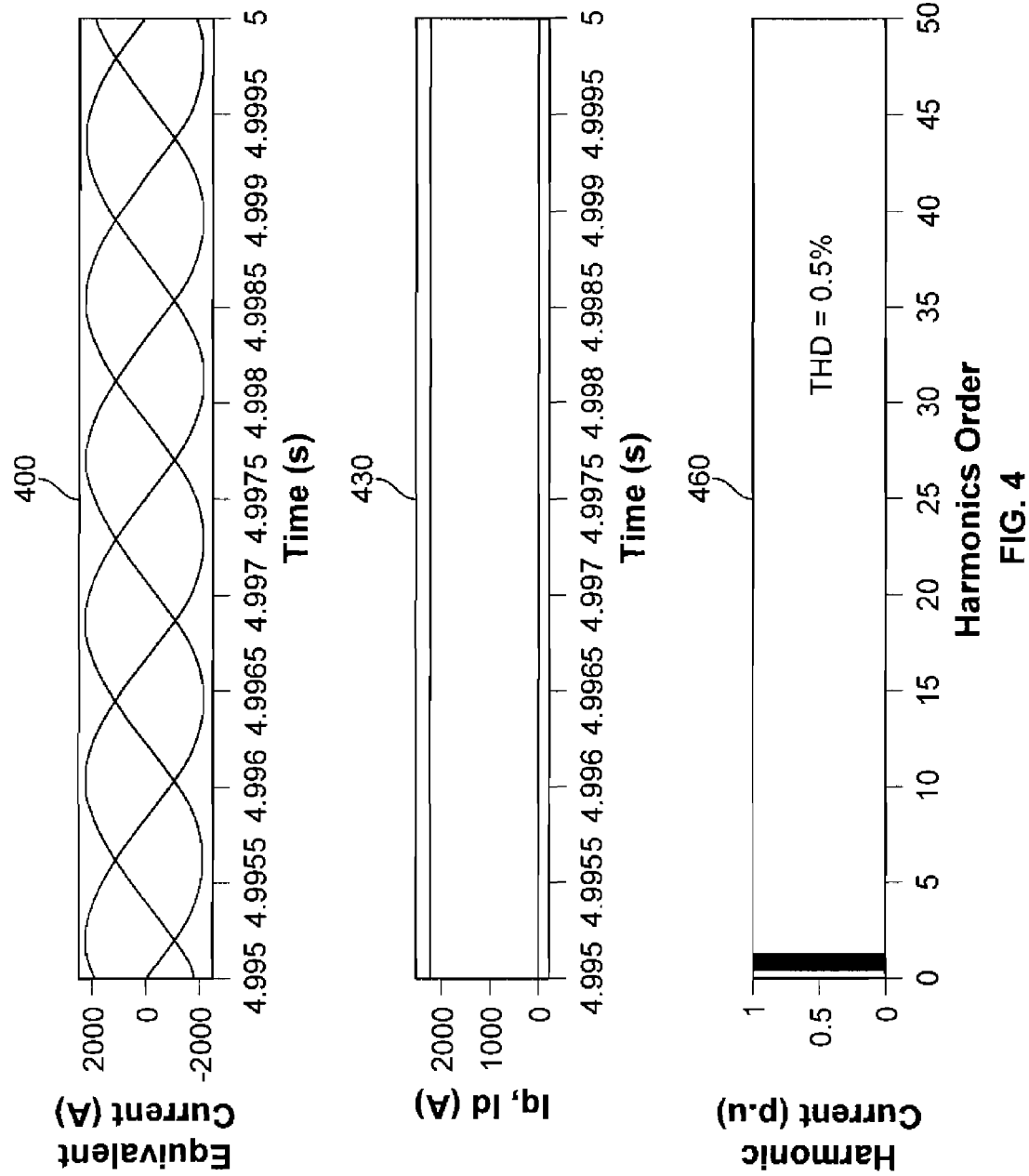
FIG. 4 shows plots of exemplary voltage and current waveforms to illustrate operation in a motoring mode.

FIG. 4 shows plots of exemplary waveforms 400, 430, 460 to illustrate operation in a motoring mode. In some examples, substantial harmonic reduction may result when the phase shifted harmonics from the adjacent three phase windings are summed up in the core of the stator. In the depicted example, several of the harmonic components have been substantially cancelled out effectively, yielding an approximate total harmonic distortion (THD) of about 0.5%. The waveforms for direct and quadrature currents, iq and id, are also shown. Depicted are effective current waveforms for N=4, id=0.0 for the case of a permanent magnet synchronous AC motor running at max power operation. The synchronous d-axis and q-axis current waveforms have substantially low ripple content without PWM operation.

Some implementations may substantially avoid the harmonic injection while still allowing for simple and minimal PWM operation on the AC drive. For example, this may be achieved in some implementations by using N of the current waveforms that are electrically phase shifted by ($\pi/3N$), where N is the set number of three phase windings. Each winding may be driven by a converter that is running at substantially full block or very low pulse width modulation frequency and is injecting harmonic currents.

Figure 6:
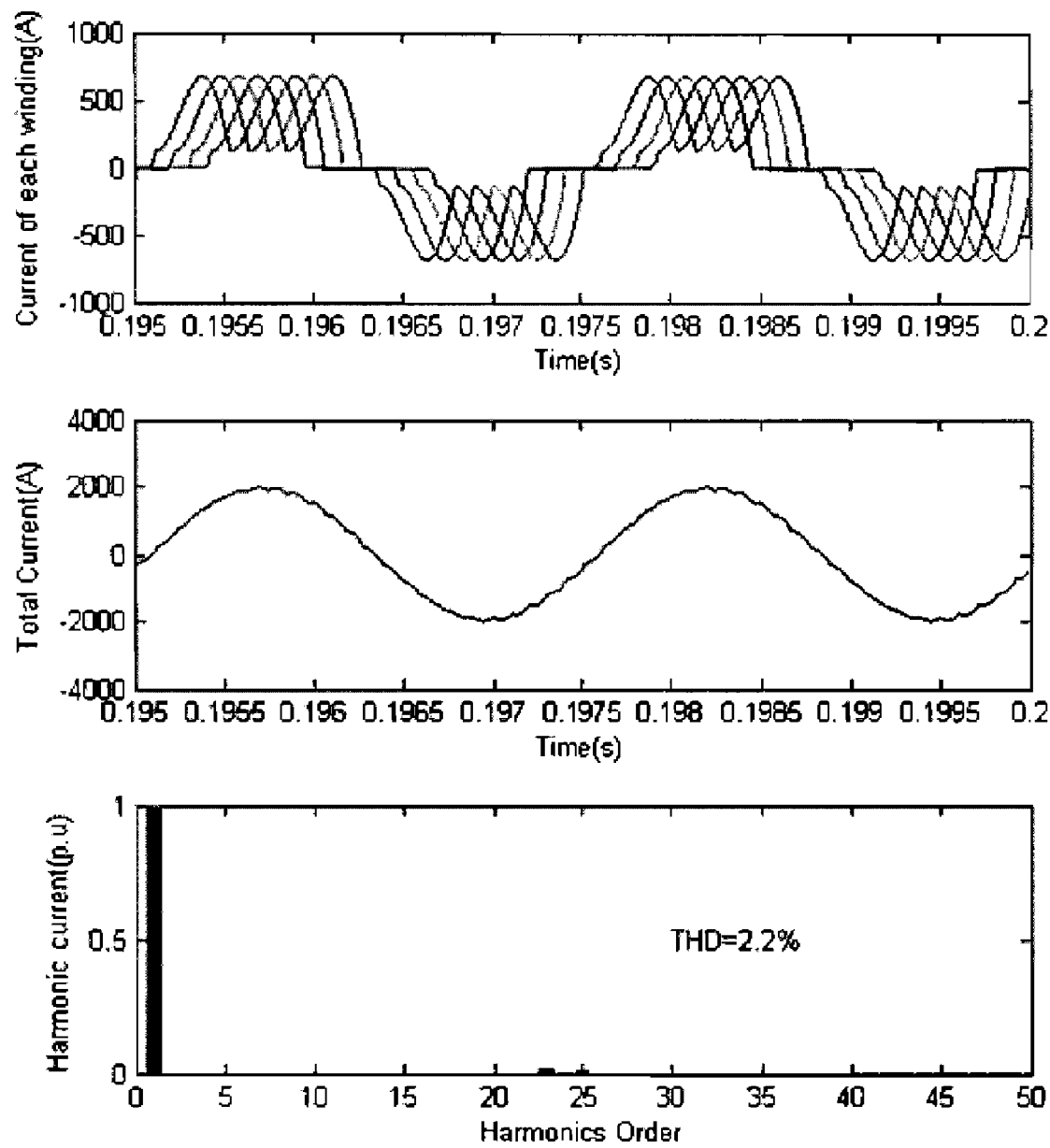
FIG. 6 shows plots of exemplary voltage and current waveforms to illustrate operation in a generating mode.

By utilizing N of the current waveforms that are electrically phase shifted by ($\pi/3N$), where N is the set number of three phase windings, the harmonic currents can be substantially mitigated. An effect of this phase shift is shown in FIG. 6, where the harmonic components cancel out up to the ($6N\pm1$) component. For N=4, the first harmonic components would be the 23rd and the $25^{th}$. As such, the effective current waveform, which is injected into the stator, may have a much lower THD value than typical rectifier three-phase bridge waveforms.

The voltage ripple frequency on a main DC link (e.g., the voltage bus 115) may be at ($6*N*f_{max}$), where $f_{max}$ is the maximum output frequency of the generator, this would normally be in the several kilohertz range for a high-speed machine. In some examples, the configuration 300 can improve a transmission quality of the DC link.

Figure 5:
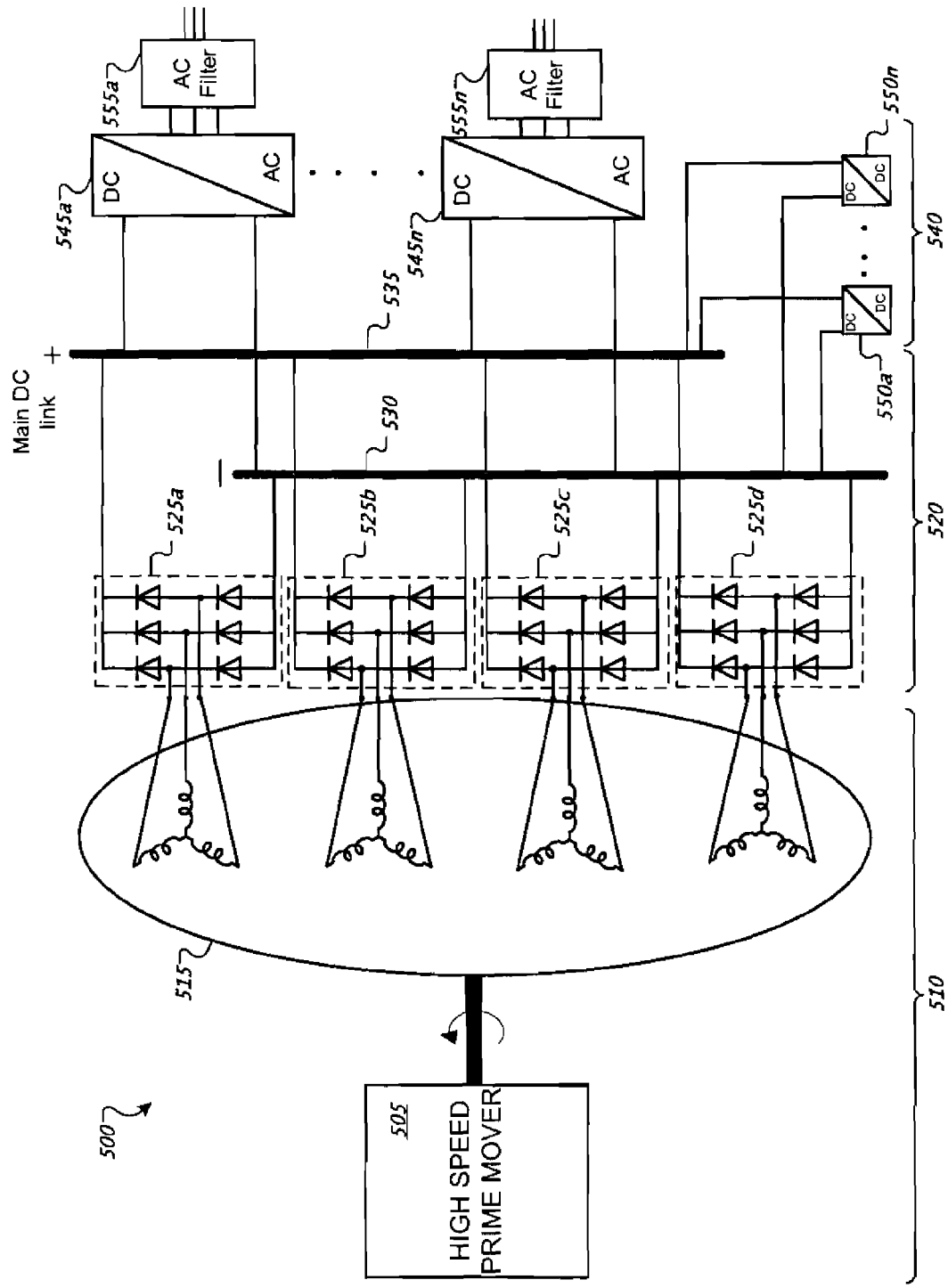
FIG. 5 shows a schematic representation of an exemplary power stage operating in a generating mode.

FIG. 5 shows an exemplary high speed high power generation system (HSHPGS) 500. The HSHPGS 500 includes a power stage 510 operating in a generating mode. The power stage 510 includes a high speed prime mover 505 and a space-shifted, split phase winding stator 505 with N=4. In one example, the stator 515 can include winding configurations as described with reference to FIG. 3. In one example, the stator 515 can process the mechanical energy of the prime mover 505 into electrical energy. The stator 515 is coupled to a power processing stage 520. The power processing stage 520 can receive power from the stator 515 and distribute electrical energy to electrical devices connected to the power processing stage 520.

In certain implementations, the prime movers 505 may be separated from the stator 515 by a gap. The gap may be filled with liquids or gasses, or a combination thereof. In one example, the gap between the rotor and stator may be partially or substantially filled with air, methane, nitrogen, hydrogen, oil, or a combination of these or other suitable materials in a liquid or gas phase.

In the depicted example, the power processing stage 520 includes switch matrices 525a, 525b, 525c, 525d. Each of the switch matrices 525a-d is connected to one of the winding sets of the stator 515. The power processing stage 515 includes two main DC links 530, 535. Both of the DC links 530, 535 are coupled one of the output ports of the switch matrices 525a-d. As shown, the switch matrices are connected in parallel to the DC links 530, 535. In operations, the switch matrices 525a-d can receive AC power from the stator 515 and output DC power to the DC links 530, 535. In certain implementations, the frequency of the power signals can be decreased from the power stage 515 to the power processing stage 520.

The DC links 530, 535 supply DC power to a DC distribution system 540. In the depicted example, the DC distribution system 540 includes multiple DC-AC converters 545a-545n and multiple DC-DC converters 550a-550n. In some embodiments, the DC-AC converters 545a-545n can convert DC power from the DC links 530,535 into AC power to support various AC devices. In this example, each of the DC-AC converters 545a-545n is coupled to a corresponding AC filter 555a-555n. As shown, the AC filters 555a-555n can supply 3-phase AC power output, such as AC power at 50 Hz or 60 Hz with r.m.s. voltage of 480 V to 690 V. The DC-DC converters 545a-545n can include step-up converters or step-down converter. In some examples, the DC-DC converter 545a-545n can supply power to DC applications using the DC power in the DC links 535, 540.

In some implementations, the power processing stage 520 can include a filter, a bridge rectifier, and/or other power conditioning components. In some implementations, the switch matrices 525a-d can be active switch matrices. Exemplary embodiments of a system for generating DC power or motoring using DC power are described in U.S. Provisional Patent Application 60/863,233 entitled "Energy Conversion System" by Ahmad, et al., filed on Oct. 27, 2006; and in U.S. Provisional Patent Application 60/864,882 entitled "Energy Conversion System" by Ahmad, et al., filed on Nov. 8, 2006. For purposes of an illustrative example, the disclosures of the detailed description portions and corresponding figures from these documents are incorporated herein by reference. To the extent any particular features are described in the incorporated disclosures as important or necessary, it will be understood that such characterizations refer to that document and are not intended to apply to all embodiments disclosed herein.

In certain implementations, high-speed permanent magnet (PM) synchronous generators can be classified based on rotor construction, such as axial or radial gap PM generators. For example, radial gap PM generators can be used in higher power ratings based on rotor dynamics. In some embodiments, radial PM generators can be grouped into surface mount or embedded magnet generators. Surface mount PM generators are more cost effective and simpler to manufacture than embedded magnet based generators. In some examples, surface mount PM generators use a sleeve to provide the required containment and a solid rotor core, or hub, may provide increased radial stiffness. Different sleeve structures can be used for containing the magnet pieces at the high rotational speeds. For example, some sleeves or membranes may include either a high strength nickel based alloy and/or a composite carbon fiber material.

The high-speed, sleeved (e.g., surface mount) PM generator can include a larger magnetic air-gap than the un-sleeved PM generator due to the sleeve thickness and the increased magnet thickness required to force an equivalent amount of flux through the larger magnetic gap. In some examples, a larger magnetic gap can provide better demagnetization protection under short-circuit conditions.

By utilizing magnetic bearings, the generator can gain the benefits of a lube-free system. In some examples, magnetic bearings can operate at higher speeds with less loss than certain types of mechanical bearings. Using high speed PM generators, a generating system can be constructed with a reduced system weight, higher operating efficiency, reduced maintenance costs, and a smaller envelope than a conventional solution in the same power rating.

To reduce the losses in high speed generators, the system 100 and the system 500 can, for example, include N sets of full pitch, three phase, space-shifted, split-phase windings for allowing connection to N passive three phase rectifiers, while keeping the machine losses to a minimal by achieving harmonic cancellation in the air gap of the machine.

In some embodiments, relatively thin, low loss silicon steel can be used to contain losses under the high-frequency operation. Using finite element analysis (FEA) techniques and a published, closed-form, analytical method, rotor losses due to eddy-currents can be predicted using a time-stepping, rotating-grid solver. In some cases, a solution can be obtained with a two-dimensional analysis without considering axial segmentation of the magnets and the electrical isolation between adjacent magnets, or a magnet and the shaft.

In one example, a finite element analysis tool may be used to recreate the winding process of the rotor with carbon fibers in a polyetheretherketone (PEEK) matrix, including the effects of rotor temperature, as a time dependent variable, carbon fiber tension, and winding feed rate. Random generation of the rotor geometry node by node according to the manufacturing tolerances may provide a system model.

The static stresses found by running a model may be input to a stress analysis tool to model the dynamic stresses in the rotor during operation. The rotor can be modeled over numerous operating conditions, including for example nominal operating speeds at various temperatures as well as at the over-speed condition under varying temperatures.

In one example, a FEA rotor dynamics software package can be used to analyze the free-free natural frequencies and mode shapes of the generator. The solution approach of the tool is to lump the mass and inertia of a defined area to create the nodes. The nodes are connected by mass-less beams. The magnetic bearings are modeled as dynamic supports with variable stiffness and damping. The magnetic bearings used in this generator consist of two radial support bearings, one to either end of the shaft and a separate active thrust bearing at the coupled end to compensate for any axial loading. A coupling appropriate to the generator size can be chosen and can be modeled as a cantilevered weight.

In an illustrative example, the total rotor weight can be over 2,000 lbs and the bearing span can be around 62 inches. The rotor can have a first forward bending mode close to the maximum operating speed of the generator. In some examples, an axial stiffening is added to the rotor resulting in a first forward bending mode of 21,029 rpm, which is 17% above the allowed generator over speed of 18,000 rpm.

Loss breakdown may be given by the electromagnetic modeling tool discussed above. A lumped parameter model is used to model the generator geometry including rotor, stator, and cooling jacket to determine the correct mass flow required to maintain a max temperature of 150° C. at 40° C. ambient per coil insulation and carbon fiber.

A separate aluminum cooling jacket with a press fit to the stator back iron pulls out heat through a water/glycol cooling flow. Curtain-air flow pulls heat out of the end turns, also air is forced through the mid stack and it exists through the end turn housing on either side of the generator. This air is required for cooling the air gap and the tooth tips of the stator.

In one exemplary embodiment, a scaled-down 100 kW back to back motor-generator system can be constructed. In one example, a stator of a generator can be configured with the proposed multiple space shifted split 3-phase winding structure. In one example, a second stator of a motor can be built with conventional fractional pitch winding (N=1). In some embodiments, the stators can have 24 slots and may use a 2 pole PM incanel based metal sleeved rotor. The electrical phase shift between adjacent slots is 15°, which may be equivalent to the simulated 48 slot, 4 pole case.

In some embodiments, the stator of the generator consists of 4 sets of 3-phase windings. Each winding set can include, for example, 3 phase single-slot full-pitch windings occupying 6 slots. For example, each winding set may be rated at 400 V and 25 kW at 500 Hz. In another embodiment, M=4 and N=5.

In some implementations, the stator may be configured with split phase winding structure and relatively long end turns relative to a fractional pitch stator. The difference may be, for example, less than half an inch. For example, each three-phase winding set may be feeding a three-phase diode ridge rectifier, each with a low inductive capacitive dc link. The outputs of the four rectifiers are coupled, either directly or in a network arrangement, together into one common DC bus and connected to a DC load bank. In some embodiments, the stator may be equipped with several thermocouples for the temperature to be measured and recorded at different locations such as the slot back iron and tooth tip.

Figure 7A:
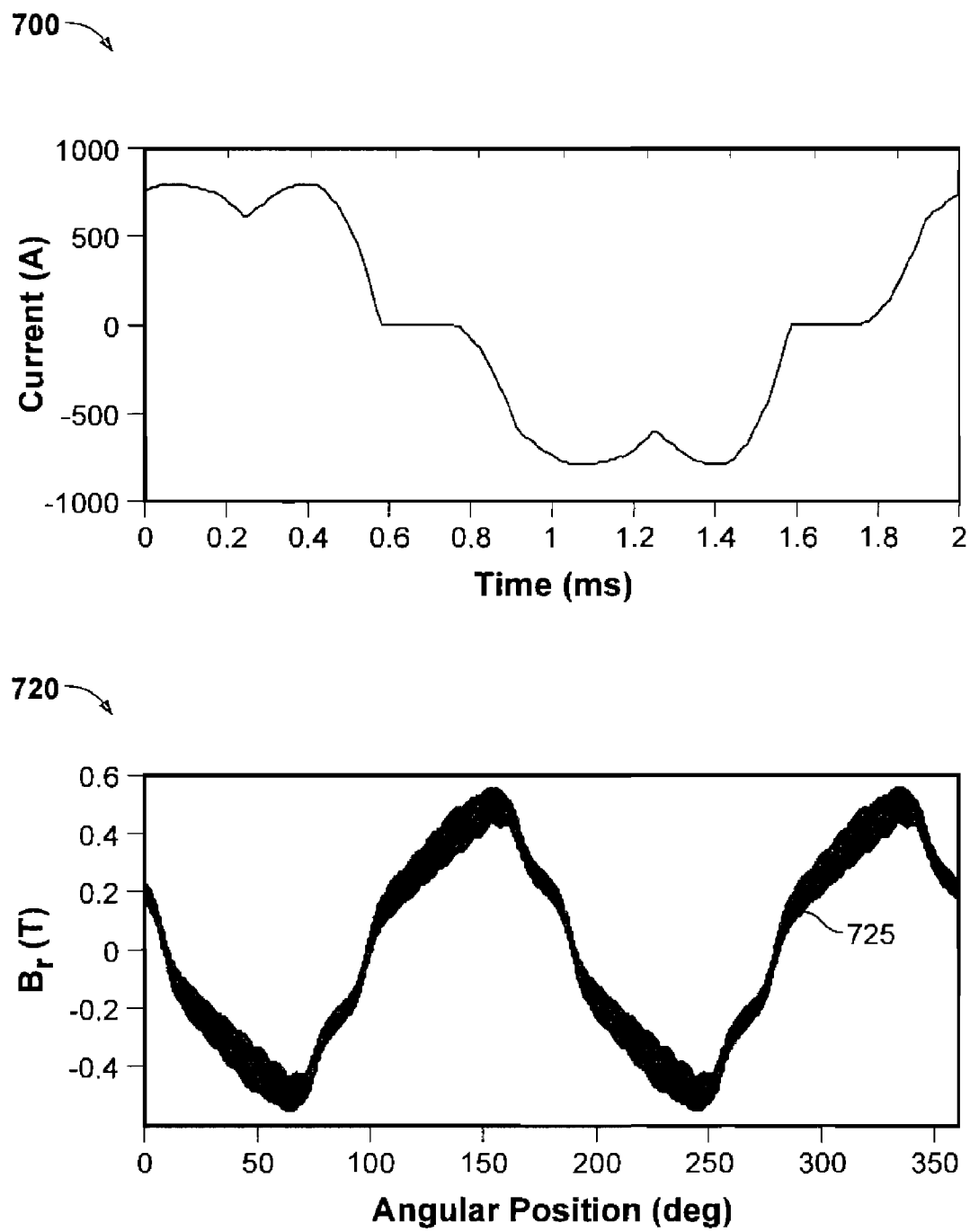
FIGS. 7A-7B show plots of exemplary flux density in an air gap with line currents.
Figure 7B:
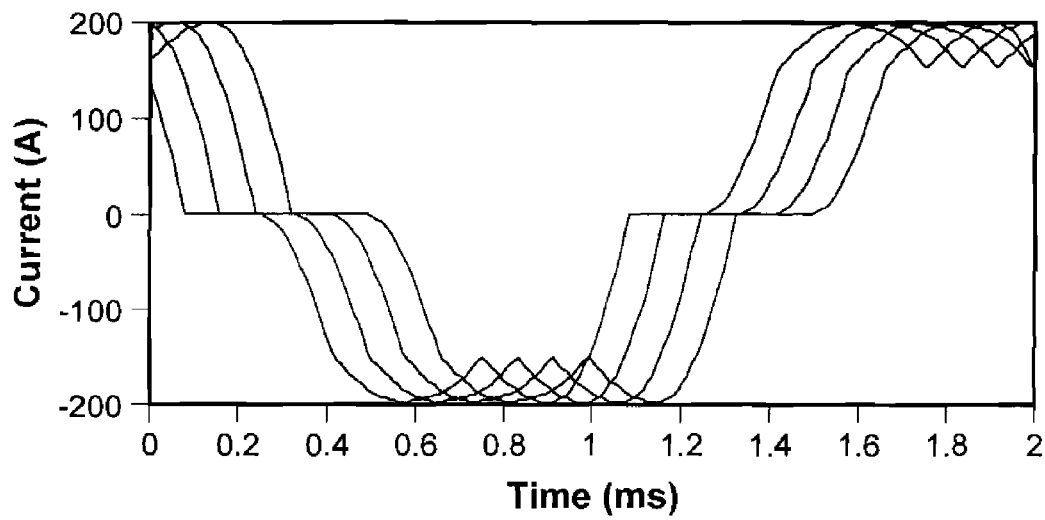
Figure 7B:
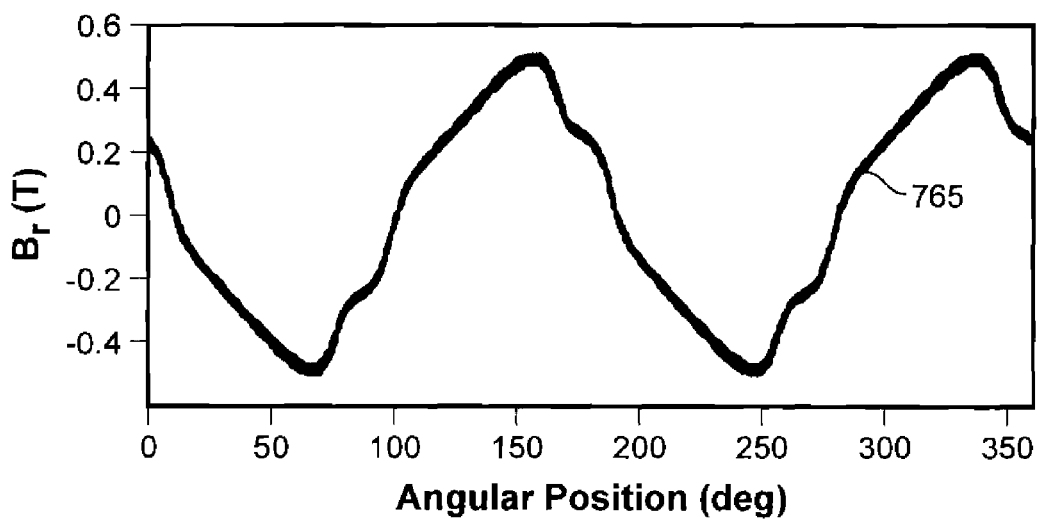

FIGS. 7A-7B show exemplary plots of total synchronous frame flux density in the air gap and line currents. As shown in FIG. 7A, plots 700, 720 are obtained using a winding configuration with N=1 with fractional pitch coils. The plot 700 shows a net magnetic flux density in the air gap including the effect of slot current time variation for the case of having N=1 with fractional pitch coils. As shown in FIG. 7B, plots 740, 780 are obtained using a winding configuration with N=4 with full pitch coils. The plot 740 shows a net magnetic flux density in the air gap including the effect of slot current time variation.

The plot 720 and the plot 760 show curves 725, 765, respectively. Thickness of the curves 725, 765 represent a flux ripple that the rotor sees and consequently rotor losses in the sleeve, magnets and hub. In some examples, a high flux ripple may induce higher eddy current losses in the magnets and hub. As shown, the flux ripple can be substantially reduced for of N=4 in the plot 760.

Figure 8:
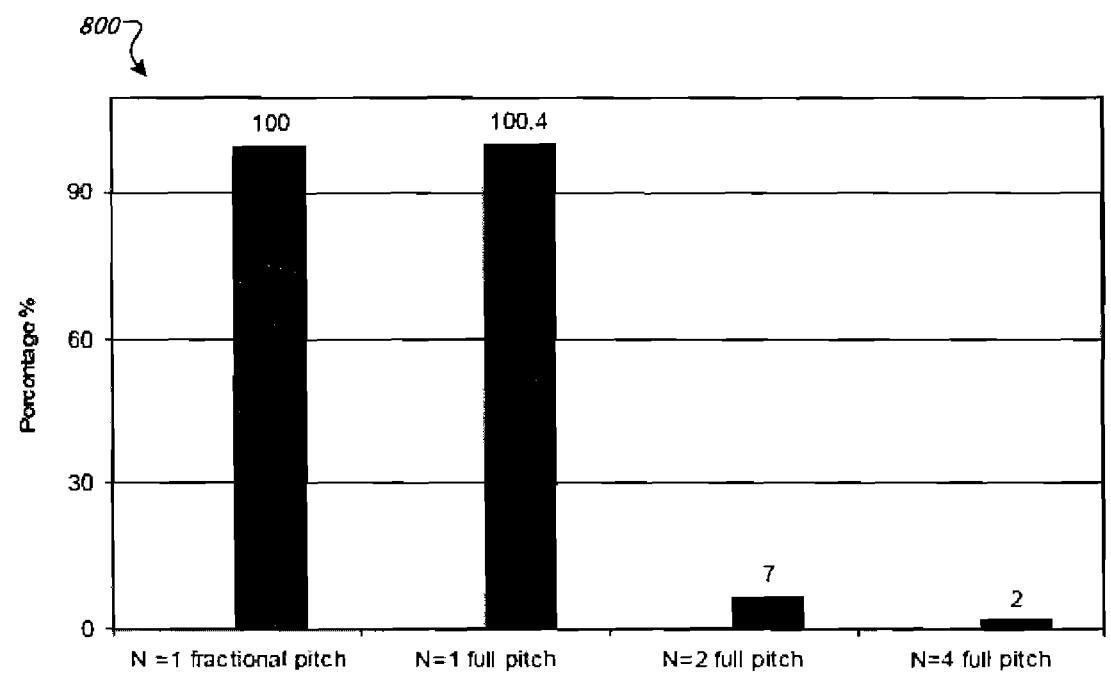
FIG. 8 shows plots of exemplary hub losses of different winding configurations.
Figure 8:
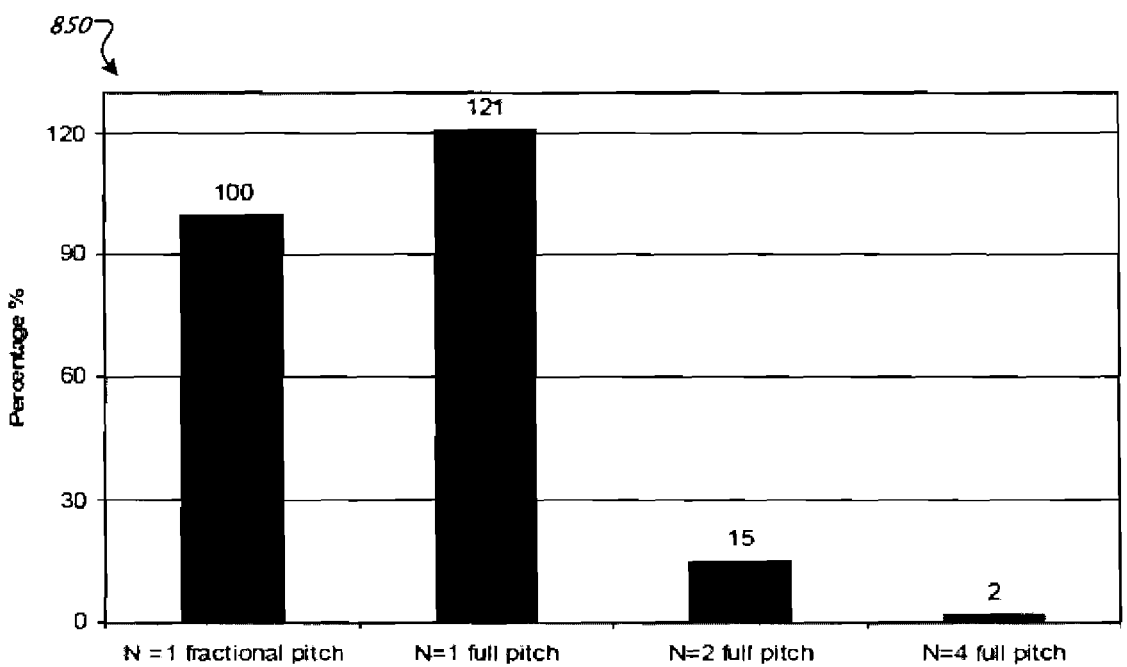

FIG. 8 shows plots 800, 850 of exemplary hub losses of different winding configurations. The plot 800 shows hub losses with different winding configurations. In the depicted example, the winding configurations of an N=1 fractional pitch configuration, an N=1 full pitch configuration, an N=2 full pitch configuration, and an N=4 full pitch configuration are shown. A 100% loss is set for the N=1 fractional pitch configuration as a baseline value. In this example, the hub losses at the N=1 full pitch configuration, the N=2 full pitch configuration, and the N=4 full pitch configuration are 100.4%, 7%, and 2%, respectively. Accordingly, a full pitch winding configuration with a number of windings equal or greater than two can substantially reduce hub loss.

The plot 850 shows peak-to-peak torque ripple with different winding configurations. In the depicted example, the winding configurations of N=1 fractional pitch configuration, a N=1 full pitch configuration, a N=2 full pitch configuration, and a N=4 full pitch configuration are shown. A 100% loss is set for the N=1 fractional pitch configuration as a baseline value. In this example, the hub losses at the N=1 full pitch configuration, the N=2 full pitch configuration, and the N=4 full pitch configuration are 121%, 7%, and 2%, respectively. Accordingly, a full pitch winding configuration with a number of windings equal or greater than two can substantially reduce torque ripple.

Figure 9:
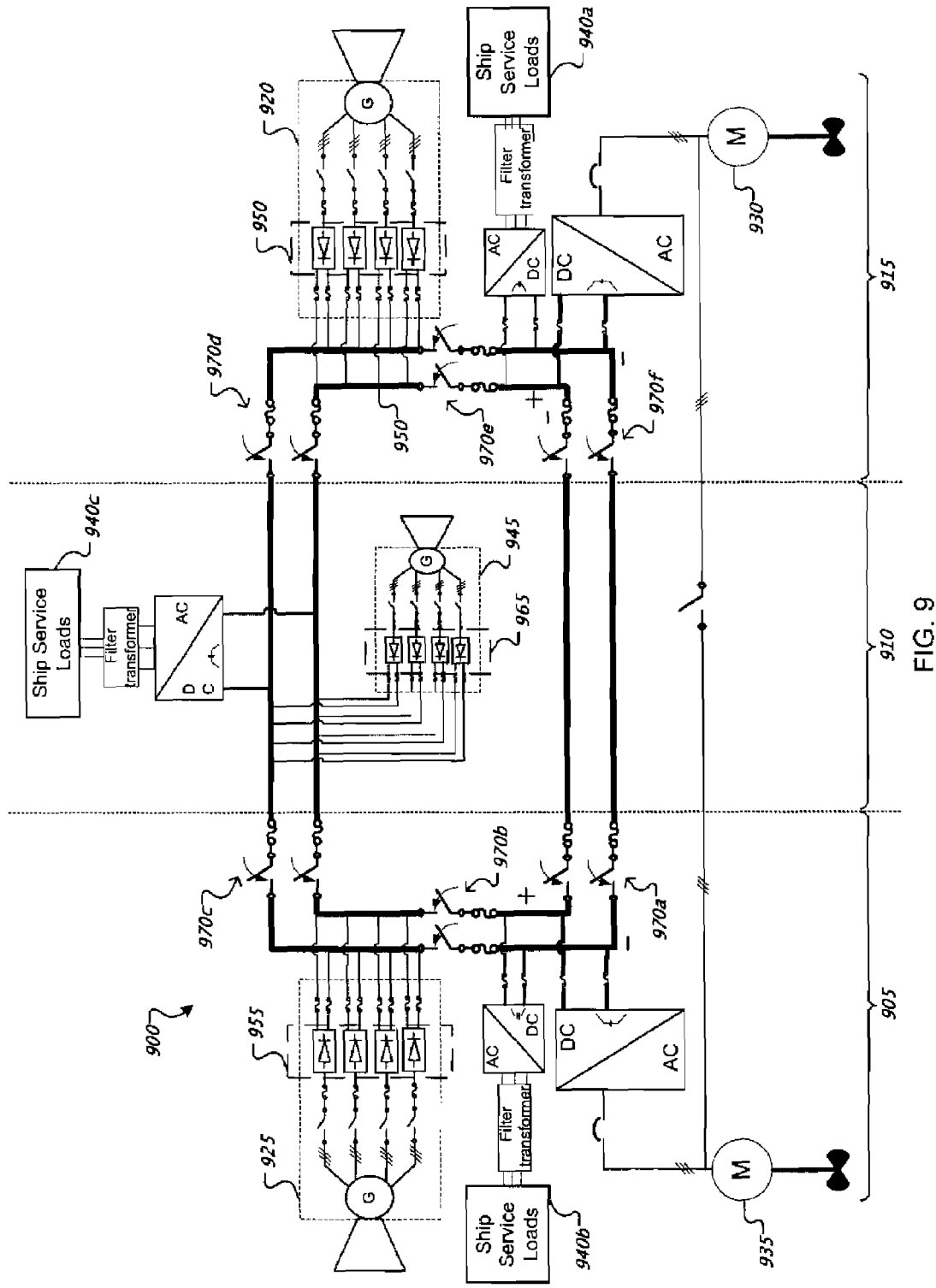
FIG. 9 shows an exemplary network of a ship electrification system.

FIG. 9 shows an exemplary zonal DC distribution network 900 for an on-board application. The network 900 includes three zones 905, 910, 915. For example, each of the zones 905, 910, 915 can be a distinct area of a ship.

In some embodiments, the network 900 includes two high-speed main generators 920, 925 feeding two propulsion motors 930, 935 on, for example, the port and the starboard sides of the ship. Also, the generators 920, 925 can supply power to the ship service loads 940a, 940b, 940c. The network 900 includes a back up HS generator system 945.

In some embodiments, similar implementations can be made for offshore platforms and air-born vehicles. In some embodiments, the generators 920, 925 can be two individual 8 MW, 15,000 rpm, 48 slot stator and 4 pole rotor PM synchronous generators. Each of the generators 920, 925 can be, for example coupled to two primary gas turbines. In some examples, the stator can be wound with space shifted, split phase, winding arrangement, as described with reference to FIG. 3. In some embodiments, each M phase winding set can be feeding a passive M phase rectifier bridge. For example, the outputs of the bridges are connected in parallel and are feeding a common voltage bus 950.

In certain implementations, the ship service loads 940a-c can be fed through step down transformers and sinusoidal filters from each of the independent zones 905, 910, 915 to provide isolation and limiting ground current interaction with the rest of the network 900. In some examples, the loads 940a-c can also be fed from a different zone in case of a fault. The backup generator system 950 can be used with similar topology, for example, a generator of 1 MW running at 15,000 rpm and configured for N=4.

In the depicted example, the electrical network 900 can include on-board applications with N=4 on the PM generator unit. Each of the generators 920, 925, 945 includes a rectifier bridge 955, 960, 965, respectively. In some embodiments, the rectifier bridges 955, 960, 965 can include fast recovery diodes to handle the high fundamental frequency of the machine (500 Hz). For example, the power rating of each of the rectifier bridges 955, 960, 965 can be rated power divided by N. In some embodiments, the rectifier bridges 955, 960, 965 can be air cooled or liquid cooled and can be packaged into the generator housing. In some implementations, the generator package can include a compact medium voltage DC generator with integrated protection, switch gear, and DC interface bus bars. In some embodiments, the network 900 can include protective devices to isolate a faulty segment or zone with minimal degradation to the overall system.

The network 900 distributes DC power across the ship. As shown, the common voltage bus 950 is ring shaped. The common voltage bus 950 can be divided according to the zones 905, 910, 915 using switch module 970a, 970b, 970c, 970d, 970e, 970f. In one example, the switches 970a-f can electrically isolate each of the zones 905, 910, 915 such that the network 900 can be reconfigured by adding and/or removing isolated zone. In some examples, the isolated zones 905, 910, 915 can provide system redundancy and flexibility. For example, in case of a fault in one or more of the zones 905, 910, 915, the power for the motors 930, 935, and the loads 940a-c can still be fed from another zone. In various embodiments, the switches modules 970a-f can be a unidirectional or bidirectional semiconductor switch, solid state relay, or the like. Using the switch modules 970a-f, the network 900 can disconnect one or more sets of windings in the generators 920, 925, 945 from the corresponding processing modules, and/or to disconnect one or more processing modules from the voltage bus 950. In some embodiments, the network 900 can substantially maintain the associated windings in an off condition while the remaining sets of windings and modules continue to operate using actively controlled switch matrices, switching control signals. In one example, in the event of winding failure in the Nth set of windings, the system can operate with N−1 winding sets and the corresponding N−1 processing modules. In some cases, the electric machine may be operated in an overloaded condition. In another example, in the event of a failure in an Nth on of the processing stages (e.g., due to open or short circuit in the electronics), one or more of the switch modules 970a-f may be opened to disconnect the failed module from the associated winding in the machine, and/or from the voltage bus.

In some examples, the network 900 can reduce harmonic losses while having passive rectifier line current waveforms, with minimal harmonic coupling/heating into the rotor. In some implementations, the generator 920, 925 and/or 945 can substantially reduce or eliminate the need for high speed active rectifiers to reduce cost, size, and/or weight. For example, weight reduction can be higher than 90% when going from active to passive rectifiers. Additionally, by eliminating the AC-DC power electronic building block (PEBB) on the load converters (because DC distribution is used), an average of 30% to 40% further reduction in weight/size for the AC propulsion drives can be obtained. In one example, one or more of the generators 920, 925, or 945 can have a height of approximately 28", a length of approximately 53", a weight of approximately 1865 lbs, and a power density of approximately 2.37 kW/kg or 3770 kW/m$^3$.

Using passive rectifiers, high system reliability/survivability and lower running costs can be achieved. In some examples, a higher system efficiency can be obtained by using passive rectifiers. In an illustrative example, a roughly 2% higher efficiency can be achieved using passive rectifiers as oppose to active rectifiers. In some examples, system efficiency can result in better overall fuel efficiency.

In some embodiments, the generators 920, 925, 945 can have a wider prime mover speed range while maintaining controlled output at the load point converters. As described above, the network 900 can be a fault tolerant system due to the redundancy (N rectifiers). Through over rating, the network 900 can lead to higher system availability (N+1), for example. By having zonal generation, distribution and intelligent power system management, single point failures can have limited negative effect on system performance since the network 900 can be designed in such a way that enables automatic bypass of the degraded section.

Figure 10:
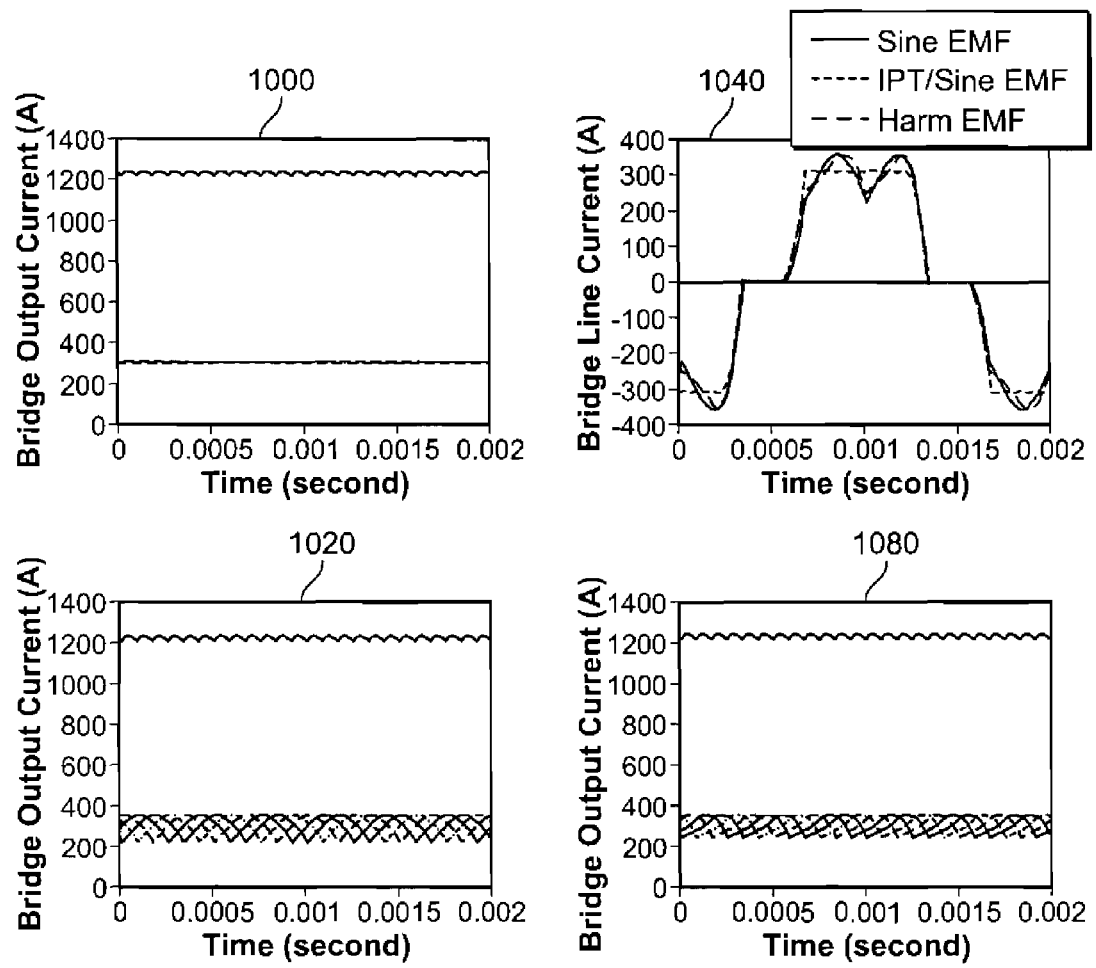
FIG. 10 shows plots of exemplary current waveform of different transformer-less electrical network topologies.

In the depicted example, the generators 920, 925, 945 can have parallel operation using a transformer-less electrical network topology. In some examples, the generators 920, 925, 945 may optionally include inter-phase transformer (IPTs). FIG. 10 shows exemplary plots 1000, 1020, 1040, 1080 of DC current for different cases of back electromotive force (EMF) waveforms and with/without IPTs. The plot 1000 shows a total load current for R load and individual bridge DC current for a system using IPTs. The plot 1020 shows a total load current for R load and individual bridge DC current for a system without IPTs and sinusoidal back EMF. The plot 1040 shows a total load current for R load and individual bridge DC current for a system without IPTs and actual back EMF. The plot 1080 shows a line current for sinusoidal back EMF without IPTs, sinusoidal back EMF with IPTs, and actual back EMF without IPTs.

To improve power density, the generator 920, 925, 945 may not include isolation transformers since the neutral points of each winding set are isolated from each other. The network 900 can include a simplified grounding scheme with minimal neutral point voltage shifting between the generators 920, 925, 945. Using the simplified grounding scheme, the network 900 can reduce special control or filtering schemes.

In some implementations, the network 900 can be interfaced with a processor that can issue master-slave commands to the generators 920, 925, 945 to direct voltage control and load sharing on the voltage bus 950. In other implementations, the voltage control and load sharing on the voltage bus 950 can be controlled by having voltage droop control on each load point converter. In some embodiments, the operating frequency range of the generators 920, 925, 945 can be at 12 kHz. In some examples, the quality of the DC link can be improved without the need for high frequency switching IGBTs or any filtering components.

Figure 11:
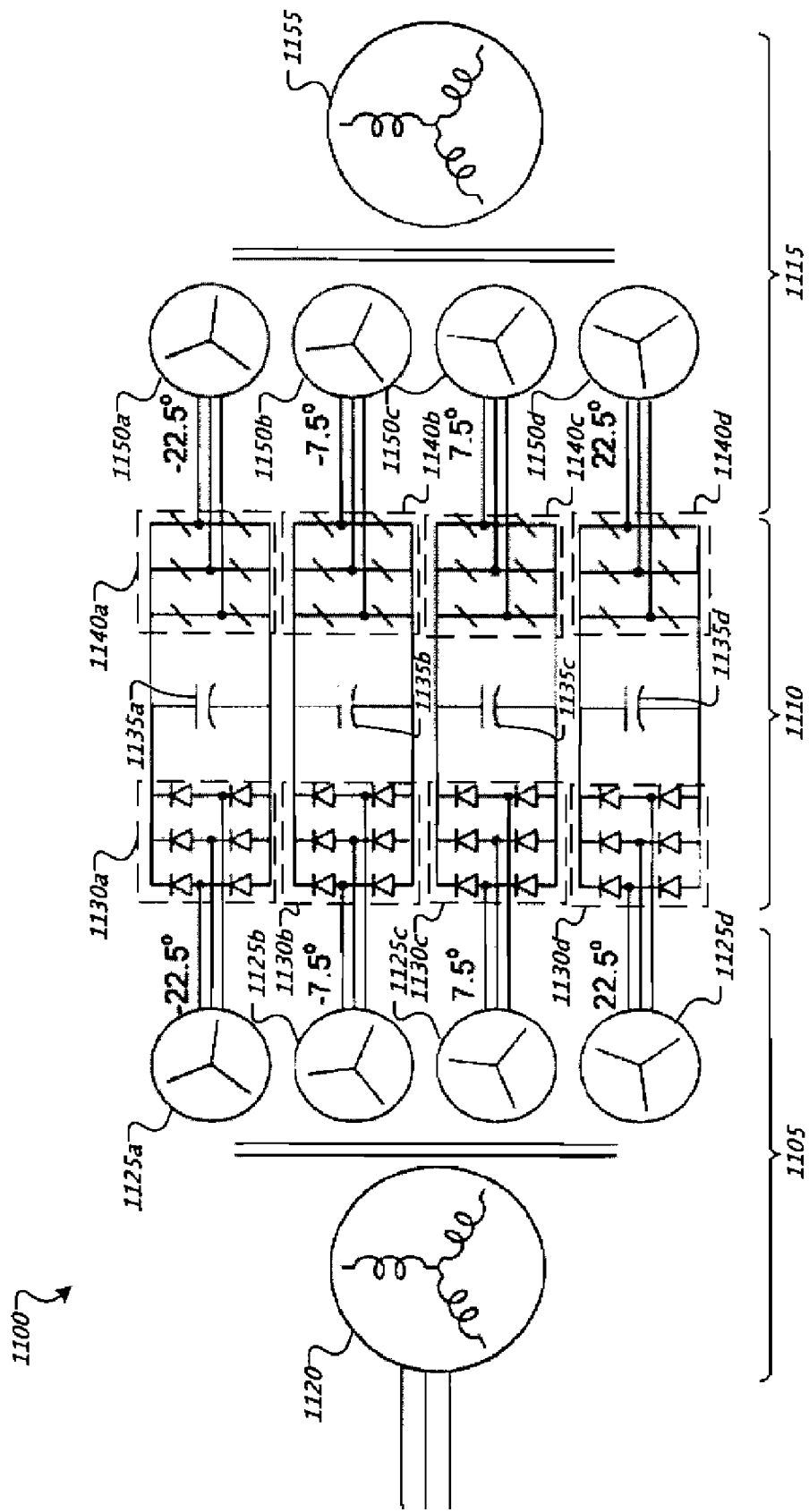
FIG. 11 shows an exemplary system having a generating and motoring topology.

FIG. 11 shows an exemplary system 1100 that is capable of generating and motoring. The system 1100 includes a generating stage 1105, a power processing stage 1110, and a motoring stage 1115.

The generating stage 1105 includes a generator 1120 to generate AC power. The generator 1120 can include a stator with a series of tooth structures separated by slots. In the depicted example, the generating stage 1105 includes four sets of windings 1125a, 1125b, 1125c, 1125d. The windings 1125a-d can be arranged substantially symmetrically in the slots of the stator. The windings 1125a-d can include M phases. In this example, each of the windings 1125a-d includes three phases. In other examples, M can be two, three, four, eight, or other numbers greater or equal to two. By way of example, and not limitation, each of the windings 1125a-d may have 15° phase difference from adjacent windings. In some examples, the arrangement in the windings 1125a-d can substantially reduce a harmonic content of a magnetic flux within a first frequency range during operation.

The power processing stage 1110 includes generator side rectifier bridges 1130a, 1130b, 1130c, 1130d, capacitors 1135a, 1135b, 1135c, 1135d, and motor side inverters 1140a, 1140b, 1140c, 1140d. In this example, each of the generator side rectifier bridges 1130a-d is coupled to a corresponding set of windings 1125a-d to receive AC power from the generator stage 1105. Each of the generator side rectifier bridges 1130a-d includes three input ports. In other examples, the rectifier bridges 1130a-d can include M input ports in which M is the number of phases in each of the corresponding windings. The rectifier bridges 1130a-d can convert the received AC power into a substantially DC power for output. Each of the rectifier bridges 1130a-d includes two output ports. Through the output ports, each of the rectifier bridges 1130a-d may be connected to the corresponding capacitors 1135a-d.

Each of the capacitors 1135a-d is coupled to the corresponding motor side inverters 1140a-d. The motor side inverters 1140a-d can receive DC power from the voltage bus and output AC power to the motoring stage 1115. In this example, the capacitors 1135a-d may include filter elements for filtering undesired frequency components in the power signal. In other embodiments, other filter elements (e.g., common mode chokes) can also be used.

In the depicted implementation, the generator side rectifier bridges 1130a-d and the motor side inverters 1140a-d are connected in parallel. In other implementations, other combinations of series and parallel connection can be used to connect the generator side rectifier bridges 1130a-d and the motor side inverters 1140a-d. For example, the rectifier bridges 1130a-d and the inverters 1140a-d can be connected to a common voltage bus in groups of two, in which each group is connected in parallel as described with reference to FIG. 1B.

As an illustrative example, the rectifier bridges 1130a-b can be connected in series and the rectifier bridges 1130c-d can be connected in series. In some examples, the outputs of the group of the rectifier bridges 1130a-b can be connected to the capacitors 1135a-b. In some examples, the outputs of the group of the rectifier bridges 1130c-d can be connected to the capacitors 1135c-d. In some examples, two or more of the recitifier bridges 1130a-d and/or inverters 1140a-d can share a common voltage bus, for example.

The motoring stage 1115 receives AC power from the inverters 140a-d. In the depicted example, the motoring stage 1115 includes four sets of windings 150a, 1150b, 1150c, 1150d. Each of the windings 150a-d can receive AC power from the corresponding inverters 1140a-d. The motoring stage 1115 includes a motor 1155. In some examples, the motor 1155 can receive electrical power from the windings 1150a-d and output mechanical power.

In some implementations, high speed, high power applications can have significant requirements on the power electronics, which may significantly increase the overall system cost. Typically, drive cost can be significantly higher than the machine cost. In some implementations, an electric distribution platform designer for a system such as the system 1100 may focus on drive optimization and matching machine parameters to drive capabilities.

In some examples, an arrangement of the system 1100 can match N number of multiple modules feeding single or N sets of multiple phase (e.g., 5 phase) stator windings. In some examples, different stator winding arrangements can be selected based on current and voltage requirements. In some implementations, the system 1100 can include stand alone high speed machine and drive packages. For example, the generator 1120 or the motor 1155 can be replaced independently without modifying the power processing stage 1110. In some examples, the system 1110 can be a cost effective high speed high power solution.

Some examples of drive solutions can be applied to the high speed, high power solutions to achieve higher system power ratings using a modular approach. To achieve higher speeds, in some embodiments, power electronics may operate with a higher THD values in the machine phase currents (e.g., by permitting lower switching frequency).

In some embodiments, a system for high speed generating applications can include a high speed alternator. For example, these applications can include gas turbine driven power generation, turbo expanders for exhaust recovery applications for large diesel shipboard engines, and turbo expanders for waste heat and waste steam recovery applications.

In certain implementations, an exemplary on-board generation system can include a high speed prime mover, such as a gas or steam turbine, which is directly coupled to a high speed AC Permanent Magnet (PM) Generator. In one example, the stator of the generator includes a set (N) of three phase windings. Each set of a three phase winding may feed a three-phase six-pulse diode bridge. In other examples, the stator of the generator includes (N) sets of (M) phase windings. Each set of M phase windings may feed an M-phase, 2*M-pulse diode bridge. The outputs of all N diode bridges may be connected in parallel, for example, and feed a main DC link (e.g., voltage bus). In various examples, the DC link may feed one or more DC/AC and/or DC-DC converters that may generate the required output voltage as a stand alone supply or as part of a distributed generation system.

Some embodiments may have one or more advantages in various applications, such as those in which size and/or weight play a significant role in selecting the proper generation system (e.g., ship board electrical generation systems and heat recovery systems).

Exemplary embodiments of a drive system are described in U.S. Patent Application 60/864,882 entitled "Energy Conversion System" by Raed et al., filed on Nov. 8, 2006. For purposes of an illustrative example, the disclosures of the detailed description portions and corresponding figures from U.S. Patent Application 60/864,882 are incorporated herein by reference. To the extent any particular features are described in the incorporated disclosures as important or necessary, it will be understood that such characterizations refer to that document and are not intended to apply to all embodiments disclosed herein.

Although various examples have been described with reference to the figures, further embodiments are possible. For example, some embodiments may be adapted by modifying teeth and/or slot widths in the stator. Varying such widths may, for example, provide additional phase shift (e.g., ±Δθ) between winding coils that may improve stator harmonic cancellation. Overlap (e.g., shading) insulation, wire layout (e.g., as it relates to resistance, inductance, interwinding capacitance, and the like) may be adjusted to take advantage or to improve stator harmonic current cancellation, including, for example, in embodiments with toothless stator configurations, for example.

Some embodiments may include N sets of windings, each set of the windings having M phases. For example, N can be greater than or equal to two (e.g., 2, 3, 4, 5, 6, 7, 8, 10, 12, 15, 18, 20, 21, 24, . . . 50 or more). In one example, N may be equal to the number of coils per pole. In another example, N may be less than (e.g., half) the number of coils per pole. In some examples, M can be greater than three (e.g., 3, 4, 5, 6, 7, 8, 10, 12, 15, 18, 20, 21, 24, . . . 50 or more). In other examples, M can be two or one. In certain implementations, the windings can be full-pitch. In some other implementations, one or more windings may have substantially fractional pitch. In certain implementations, the electric machine can include an integral number of slots-per-pole-per-phase or a non-integral number of slots-per-pole-per-phase.

Some embodiments may include power-electronic switches that are actively controlled (e.g. insulated gate bipolar transistors, IGBTs). Other embodiments may include passive power electronic switches (e.g., diodes). In some implementations, switch matrices (e.g., the switch matrices 105a-105n) can be connected in series. In some examples, outputs of one or more of the switch matrices can feed distinct loads. In some implementations, a single electric machine with N winding sets may be connected to up to N (e.g., N, N–1, N–2, etc . . . ) switch matrices (e.g., passive or actively controlled) for operation in a generating mode, and also connected to up to N (e.g., N, N–1, N–2, etc . . . ) switch matrices (e.g., actively controlled) for operation in a motoring mode. In various examples, the number of switch matrices for operation in the generating mode need not be the same as the number of switch matrices for operation in the motoring mode. In some examples, one or more of actively controlled switch matrices may serve a single electrical machine in both a motoring mode and in a generating mode.

In some implementations, a generation or motoring system (e.g., the system 100 or the system 150) can include passive filter elements between the machine 110 and the switch matrices 105a-105n. For example, the system 100 can include passive filter elements after the switch matrices 105a-105n. In another example, the system 150 can include active filter elements between the machine 110 and the switch matrices 105a-105n. In some examples, the system 100 can also include active filter elements after the switch matrices 105a-105n. In some embodiments, the filter elements can have a common connection point. In various implementations, the passive filter elements can include an IPT.

In some embodiments, a stator winding can have a double layer winding or a single layer winding. In some embodiments, a portion of the stator coils can be terminated on one end of the stator and the remaining coils are terminated on the opposite end of the stator.

In some embodiments, an electric power generation system (e.g., the system 500) can include a linear electric machine with a stator having multiple (N) poly-phase (M-phase) winding sets and a power-electronic switch matrix for each poly-phase winding set. In other embodiments, an electric power generation system (e.g., the system 500) can include a rotating electric machine with a stator having multiple (N) poly-phase (M-phase) winding sets, a multi-pulse transformer, and a power-electronic switch-matrix for each poly-phase winding set. In some examples, the multi-pulse transformer can be used in motoring applications. In other embodiments, an electric power generation system (e.g., the system 500) can include a linear electric machine with a stator having multiple (N) poly-phase (M-phase) winding sets, a multi-pulse transformer, and a power-electronic switch matrix for each poly-phase winding set. In various embodiments, air gap flux harmonic cancellation may be applied to a variety of types of machine designs, including synchronous, induction, wound rotor, reluctance, permanent magnet, for example.

Some embodiments may substantially control losses associated with stator harmonic currents in high-speed machines by switching the drive semiconductor devices at substantially low switching frequencies (e.g., fundamental frequency in the case of diode bridges). Switching losses in the devices may call for increased thermal management to address motor and power electronics temperatures. This may, for example, reduce system temperatures, thus allowing for increased lifetime or simply allowing for more power capacity out of the system, which may reduce or eliminate the need for cooling mechanisms to remove heat from the drive system components, such as the semiconductors, bus bars, and/or cables, for example. As applied to high power and medium-to-high voltage applications, reduced switching frequency generally involves reduced insulation ratings to withstand the repetitive switching of the AC drive devices. Fundamental (or near fundamental) switching frequencies may also reduce conducted and/or radiated EMI (Electro Magnetic Interference) emissions that may adversely affect neighboring systems. These and other issues can simplify drive integration and packaging.

In some heavy-duty applications (e.g., marine), systems are typically required to be fault tolerant. Some approaches involve cold stand by units or hot running modules that are on-line but are not sharing any loads, or would include N units sharing the load, each rated at (Full Load+X %)/N. This allows continuous operation (possibly without de-rating based on the value of X) even in the case of a fault on the drive or the machine.

In some applications in which the machine 110 is coupled to a high-speed prime mover, such as a turbine, for example, a voltage on the bus 115 may be controlled by a speed governor on the prime mover.

In some applications, voltage bus circuitry may include a number of various loads and/or sources. The voltage bus 115 may provide a DC transmission to supply distributed loads, for example, on board a ship, aircraft, or other environment that uses a DC utility grid (e.g., transformer-less systems). The loads may include, but are not limited to, switch-mode and/or linear loads, DC-to-AC loads (e.g., propulsion or traction systems), DC motors, lighting, heating, or combinations of these or other loads.

Use of space shifted split phase N stator windings in combination with an AC generator allows for the use of simple diode bridges for converting AC to DC voltage and avoids any need for high speed, expensive, bulky, high loss active rectification systems without adding any more losses into the machine or over heating the machine.

Although passive rectification may be less costly than active rectification, with a typical passive rectifier the current waveforms can be distorted by the time-harmonic components. Namely the fifth, seventh, and higher order multiples of the fundamental frequency. The current waveform distortion can produce additional losses in the machine, which can limit the power and/or speed capability of the system.

In a typical active rectifier, switching devices generally switch at higher frequency as the machine rotates faster. However, as the devices switch faster, their switching losses can increase, which can lead to significant heat dissipation in the switching devices. Furthermore, switching losses are proportional to the operating power of the device. Accordingly, switching losses in the drive may determine speed and/or power capability for the overall system.

Switching losses and conduction losses in passive rectifiers are generally less than the corresponding losses in active rectifiers. This gives higher overall system efficiency if the extra harmonics present in the line current of the passive rectifier are filtered without incurring extra losses.

Some generation applications use a multiple three-phase-winding system, phase shifted from each other, typically two three-phase-winding sets phase shifted by 30 degrees electrical, to achieve harmonic cancellation in the air gap flux distribution Multiple three-phase-winding generators normally include sinusoidally distributed multiple-phase-winding sets with independent neutrals. Some windings may be arranged in WYE, DELTA, STAR, or other suitable configuration. Each winding set consists of multiple coils per pole per phase arrangements with variable pitch factors.

A higher speed machine typically has reduced size and weight. This yields a higher power density and consequently a more difficult thermal management problem. Analogous to the switching devices, the machine may be oversized or the thermal management system improved to protect the machine from overheating. However, the inherent decrease in active material offsets the cost to over-size the machine or the cost of implementing a more effective thermal management system for the machine.

Unlike a high-speed machine, there is no decrease in size or rating of the power electronics to offset the cost of an improved thermal management scheme, there is even an increase in size and ratings on the power electronics to handle the losses associated with high-speed operation. This contributes to the fact that the power electronics costs roughly two to three times as much as the machine, when including high frequency rectification and inverting back to typical line frequencies. Optimization and simplification of the power electronics, when balanced against increased machine cost, may substantially reduce overall cost of ownership, for example. For example, reductions in current waveform distortion may reduce losses in the power electronics and/or losses in the electric machine. Moreover, simplification and reduced component count may advantageously improve overall system reliability associated with an expected FIT (Failure In Time) rate.

In general, some embodiments include a system for use with a high-speed prime-mover, an electromechanical unit (e.g., high-speed permanent-magnet machines) and a high frequency (e.g., substantially above 120 Hz fundamental frequency) multi-pulse (6N) transformer with one three-phase primary winding and multiple three-phase secondary windings feeding N three-phase passive-rectifier bridges. This embodiment may achieve low order harmonic cancellation in the air-gap flux of the machine while using passive rectifiers without the need for active rectification systems or any modifications to the machine stator windings.

An exemplary topology for high-speed, high power density, high-pole-count system configuration may address technology limitations on semiconductors including but not limited to cooling techniques while minimizing the drive cost. In some embodiments, cooling may include axial flow of a thermal transfer fluid (e.g., liquid,gas, or a combination thereof) in the gap between the rotor and the stator, and/or end turn cooling using a flow of a thermal transfer fluid. By way of example, and not limitation, a substantial portion of the fluid in the gap may include methane, hydrogen, nitrogen, natural gas, oil, or a combination of these and/or other fluids, which may or may not be flammable. For example, a cooling system may include both forced axial air flow through the air gap and an independent air curtain to cool end turns at either or both ends of the rotor. Examples of such a system are described in a copending provisional patent application U.S. Provisional Patent Application 60/895,025 entitled "High-Speed, Sleeved Rotor for Permanent Magnet Electric Machines" by Saban, et al., filed on Mar. 15, 2007, with common inventors, the contents of which are incorporated herein by reference. Some examples may include protection for sleeving the rotor and/or stator components to isolate them from the medium in the gap. In one example, the rotor sleeve may be affixed to the rotor and rotate with it and may extend the entire length of the rotor or only a portion of the length of the rotor. In some examples, the stator sleeve may be fixed on the stator and typically completely isolate the stator.

Some embodiments include an exemplary topology for configuring the machine stator as a filter by controlling the inductances, air-gap, and winding configuration to allow the stator to act as a filter for harmonics present in the phase currents. This alleviates the use of external filters to the machine before connecting to passive rectifier bridges. The topology may include a high speed AC machine stator winding configuration that is based on using a single coil per pole per phase. Such a configuration may provide advantages in economically achieving N>2 without adding significant complexity and cost into the machine, while extending flexibility in current/voltage design trade-offs during the machine electromagnetic design.

Embodiments having N sets of M phase windings in a generator, each set feeding a dedicated M phase power electronics converter (e.g., passive diode bridges) may provide fault tolerance and continuous operation in the case of either a failure on the converter side or the machine side or both. De-rating will depend on the sizing of the individual converter block and the machine winding set.

High speed machine attributes in terms of reduced size, weight and foot print may be matched on the power electronics and auxiliary equipment side. The system topology provides for system isolation and redundancy substantially without the need for isolation transformers, current sharing reactors or inter Phase Transformers (IPTs), although such elements may be incorporated to serve a flexible range of well known functions.

A number of embodiments have been described. Nevertheless, it will be understood that various modifications may be made. For example, advantageous results may be achieved if the steps of the disclosed techniques were performed in a different sequence, if components in the disclosed systems were combined in a different manriner, or if the components were replaced or supplemented by other components. Accordingly, other implementations are within the scope of the description.

What is claimed is:

1. An energy processing system comprising:
    an electric machine that comprises:
        a stator with a plurality of winding locations distributed substantially evenly across a surface of the stator; and
        a plurality of conductors formed into a plurality of coils arranged substantially symmetrically among the plurality of winding locations and connected to form a number (N) of sets of multiple (M) phase windings, wherein for each of the windings, each of the coils spans a single pole to form a full pitch winding, and wherein each of the N sets of windings are substantially offset with respect to each other so as to substantially reduce a harmonic content of a magnetic flux within a first frequency range during operation; and
    a processing stage that comprises N substantially independent modules corresponding to each of the N sets of windings, each of the N modules having M input ports for connection to each of the corresponding M windings, and having a first and a second output port, wherein the first and second outputs ports for each of the N modules are connectable to a first node and a second node of a voltage bus.

2. The system of claim 1, wherein the electric machine comprises a linear machine.

3. The system of claim 1, wherein the electric machine comprises a rotating machine.

4. The system of claim 1, further comprising an interface to allow energy transfer between the voltage bus and an electric distribution system.

5. The system of claim 4, wherein the electric distribution system comprises a ship-borne electric distribution system.

6. The system of claim 5, wherein the ship-borne electric distribution system comprises a DC (direct current) distribution system.

7. The system of claim 1, wherein each of the modules comprises a filter.

8. The system of claim 1, wherein each of the modules comprises a bridge rectifier.

9. The system of claim 1, wherein each of the modules comprises an active switch matrix.

10. The system of claim 1, wherein the voltage bus comprises a DC (direct current) voltage bus.

11. The system of claim 1, wherein the stator further comprises a plurality of tooth structures between windings at adjacent winding locations, each of the plurality of tooth structures having substantially the same size.

12. The system of claim 1, wherein each of the plurality of winding locations comprises a slot, each of the slots having substantially the same width.

13. The system of claim 1, wherein the first frequency range comprises frequencies substantially less than a harmonic of a fundamental electrical frequency in the machine, wherein the harmonic number of the fundamental electrical frequency is twice M multiplied by (N−1).

14. The system of claim 1, wherein the electric machine further comprises a permanent magnet rotor separated from the stator by a gap.

15. The system of claim 14, wherein the gap is at least partially filled with a fluid during operation.

16. The system of claim 15, wherein a substantial portion of the fluid in the gap comprises a flammable fluid.

17. The system of claim 1, wherein the first and second outputs ports for each of the N modules are connected in series between the first node and the second node of the voltage bus.

18. The system of claim 1, wherein the first and second outputs ports for each of the N modules are connected in parallel between the first node and the second node of the voltage bus.

19. A method for providing for electromechanical energy conversion, the method comprising:
    providing an electric machine that comprises:
        a stator with a series of tooth structures separated by a corresponding plurality of slots; and
        a plurality of conductors formed into a plurality of coils arranged substantially symmetrically in the plurality of slots and connected to form a number (N) of sets of multiple (M) phase windings, wherein for each of the windings, each of the coils spans a single pole to form a full pitch winding, and wherein each of the N sets of windings are substantially offset with respect to each other so as to substantially reduce a harmonic content of a magnetic flux within a first frequency range during operation; and
    processing energy between the electric machine and a voltage bus using a processing stage that comprises N substantially independent modules corresponding to each of the N sets of windings, each of the N modules having M input ports for connection to each of the corresponding M windings, and having a first and a second output port, wherein the first and second outputs ports for each of the N modules are connectable to a first node and a second node of the voltage bus.

20. The method of claim 19, further comprising replacing the electric machine with a second electric machine with a second number (N2) of sets of multiple (M) phase windings, wherein for each of the windings, each of the coils spans a single pole to form a full pitch winding, and wherein each of the N2 sets of windings are substantially offset with respect to each other so as to substantially reduce a harmonic content of a second magnetic flux within a second frequency range during operation.

21. The method of claim 20, further comprising replacing the processing stage with a second processing stage that comprises N2 modules having M input ports for connection to each of the corresponding M windings, and having a first and a second output port, wherein the first and second outputs ports for each of the N2 modules are connectable to the first node and the second node of the voltage bus.

22. The system of claim 1, wherein the windings carry a current having a $\pi(M*N)$ electrical phase difference between adjacent winding locations during operation.

23. The method of claim 19, wherein the windings carry a current having a $\pi(M*N)$ electrical phase difference between adjacent winding locations during operation.

* * * * *

UNITED STATES PATENT AND TRADEMARK OFFICE
CERTIFICATE OF CORRECTION

PATENT NO.         : 7,710,081 B2
APPLICATION NO.    : 11/751450
DATED              : May 4, 2010
INVENTOR(S)        : Daniel M. Saban, Raed Ahmad Bkayrat and Zhiguo Pan Page 1 of 1

It is certified that error appears in the above-identified patent and that said Letters Patent is hereby corrected as shown below:

In column 20, claim 22, line 57 – replace "π(M*N)" with -- π/(M*N) --

In column 20, claim 23, line 60 – replace "π(M*N)" with -- π/(M*N) --

Signed and Sealed this

Fifteenth Day of February, 2011

David J. Kappos
*Director of the United States Patent and Trademark Office*